United States Patent [19]

Smyth

[11] Patent Number: 5,687,291

[45] Date of Patent: Nov. 11, 1997

[54] METHOD AND APPARATUS FOR ESTIMATING A COGNITIVE DECISION MADE IN RESPONSE TO A KNOWN STIMULUS FROM THE CORRESPONDING SINGLE-EVENT EVOKED CEREBRAL POTENTIAL

[75] Inventor: Christopher C. Smyth, Fallston, Md.

[73] Assignee: The United States of America as represented by the Secretary of the Army, Washington, D.C.

[21] Appl. No.: 675,329

[22] Filed: Jun. 27, 1996

[51] Int. Cl.$^6$ .............................. G06F 15/00; G06G 7/00

[52] U.S. Cl. ........................... 395/10; 395/3; 395/51; 128/731; 128/732

[58] Field of Search .................... 395/10; 128/731, 128/732

[56] References Cited

U.S. PATENT DOCUMENTS 5,386,498  1/1995  Kakefuda ................................. 395/75

OTHER PUBLICATIONS

Vidal, "biocybernetic control in man–machine interaction: final technical report 1973–74" California University, NTIS, Dec. 1974.

Smyth, "The use of single event evoked cerebral potentials to predict stimulus identifications," Proceedings of the human factors society 34th annual meeting pp. 1431–1435, Dec. 1990.

Cerutti, "A parametric method of identification of single trial event related potentials in the brain," IEEE transactions on biomedical engineering, v35 n9, Dec. 1988.

Raghavan, "context based detection of epileptogenic sharp transients in the eeg," dept of elec. engin., University of houston, Dec. 1988.

Park, "A knowledge–based approach to abnormal eeg spike detection," doctoral dissertation, university of florida, Dec. 1990.

Nogawa, "Visual evoked potentials estimated by wiener filtering" Electroencephalography and clinical neurophysiology; 35, Dec. 1973.

*Primary Examiner*—George B. Davis
*Assistant Examiner*—Jeffrey S. Smith
*Attorney, Agent, or Firm*—Freda L. Krosnick; Paul S. Clohan

[57] ABSTRACT

The present invention estimates the cognitive decision made in response to a known stimulus from the corresponding single-event evoked cerebral potential. The present invention uses a unique recursive procedure to identify the decision from a mathematical description of the potential as the output of a cerebrally located, autoregressive, moving average filter with the stimulus as an exogenous input. The procedure employs in a two-step sequence, the least squares algorithm to update the filter coefficients, followed by a Taylor's Series approximation for updating an internal cerebral source signal which is generated in response to the external stimulus. The recursive procedure computes the attenuation used by the moving average component of the filter to produce the cerebral source signal. This procedure is repeated for all feasible cerebral source signals, computed from the set of possible event evoked average response potentials, to produce a set of attenuator-values. These values are then used as input to a multiple-layered, feed-forward artificial neural network for identifying the decision made from the set of feasible responses. In turn, the power spectrum computed from the autoregressive coefficients is used to track the cognitive state and therefore the reliability of the decision estimate. The present invention may be used for the control by mental thought of computerized visual and aural display functions, by measuring the electroencephalogram in time with the operant orientation of the user onto a displayed stimulus.

2 Claims, 18 Drawing Sheets b1, b2, b3, ...., bn - input node variables 5,687,291

1

METHOD AND APPARATUS FOR ESTIMATING A COGNITIVE DECISION MADE IN RESPONSE TO A KNOWN STIMULUS FROM THE CORRESPONDING SINGLE-EVENT EVOKED CEREBRAL POTENTIAL

GOVERNMENTAL INTEREST

The invention described herein may be manufactured, used and licensed by or for the United States Government without payment to me of any royalty thereon.

CROSS-REFERENCE TO RELATED APPLICATIONS

The subject matter of this application is related to that disclosed in copending application Ser. No. 08/439,392 filed May 11, 1995, Ser. No. 08/675,330 filed Jun. 27, 1996, Ser. No. 08/407,142 filed Mar. 17, 1995, and Ser. No. 08/695,847 filed Aug. 9, 1996.

TECHNICAL FIELD

The present invention relates to human-machine interface in general and more particularly to a method and device for translation of single event potential recordings into real-time machine commands for control of complicated systems by mental thought.

BACKGROUND ART

There is no prior art known to me for accurately estimating a cognitive decision from the corresponding single-event evoked cerebral potential. There has been prior work done in the laboratory on the mental control of machines by event averaged evoked cerebral potentials. For example, the amplitude of the P300 component of the event averaged transient potential has been used to select video display cues from a set of randomly repeated cue markers. The transient potential duration is on the order of several 100-milliseconds however, and event averaging by using repetitive signals demands an unnaturally long attention on the order of 10 seconds by the human operator to the cue markers. The result is a procedure that would interfere with the performance of most tasks. In another example, the power spectrum of a visually evoked steady state potential has been used to select a visual display cue from a field of display cues with different flash rates. The power spectrum will have a peak at the flash rate for the gazed display cue. However, the power spectrum of the steady state potential is computed from the fourier transform of a windowed signal of several seconds duration. This process is a form of short term averaging which requires forced visual fixation by the operator on the cue marker and for this reason tends to interfere with task performance.

In still another example reported by McMillan (McMillan, G. [1995] "Brain-Actuated Control: Thinking ahead to Firefox", Cseriac Gateway, 6(5), 8–11, A description of EEG-based control of the roll position of a flight simulator developed at the Armstrong Laboratory, Wright-Patterson Air Force base, OH), the changes induced by a subject in the power spectrum of a visually evoked steady state potential, generated while looking toward a 13.25 Hertz flashing light, have been used to control the turn direction of a flight simulator, either left or right. Again, the power spectrum of the steady state potential is computed from the fourier transform of a windowed signal of several seconds duration, and this short term averaging requires

2 forced concentration by the operator which interferes with task performance. Furthermore, the light source must be intense, flashing (near critical fusion frequency) and within the vision-field of the human subject. For these reasons, the real-time estimation of mental decisions by the prior art is impractical and this along with the control of machinery remains the domain of operant-motor activity by the human.

A recent study by Cerutti, Chiarenza, Liberati, Mascellani, and Pavesi (Cerutti, S., Chiarenza, G., Liberati, D., Mascellani, P., & Pavesi, G. [1988], "A parametric method of identification of single-trial event-related potentials in the brain", IEEE Transactions on Biomedical Engineering, 35, 701–711, A description of a moving average, autoregressive model for the cerebral potential with the stimulus as an exogenous input) has proposed a parametric method for identifying single-trial event-related potentials in the brain. The method uses a moving average, autoregressive filtering model of the cerebral potential with the stimulating event as an exogenous input. The solution is generated by a recursive computation of the estimated potential from the filtering model where an assumed event average response potential is used as the initial estimate. However, the reasoning for the recursive process is intuitive in nature without a stated mathematical basis and the resulting computative stability is not necessarily assured by this approach. Perhaps for this reason, the method is reported to be ineffective in application.

The problem is that the single-event evoked potential is buried deep within the surrounding cortical activity which is measured by the electroencephalogram (EEG). Because the EEG is the result of manyfold cortical voltage sources, the evoked potential is only readily measured and correlated to operative and cognitive activities by the prior art under very carefully controlled test conditions. The evoked potential has the appearance of a low level voltage source with a predominant noise field. The amplitude of the background EEG is roughly 20 microvolts. The single event evoked potential is on the order of 5 microvolts. The resulting 0.25 signal to noise ratio is on the order of −12 decibels (dB), but can be as low as −30 dB (0.033 signal to noise ratio).

In addition, exogenous inputs known as artifacts are generated by extracerebral motor processes. These processes include saccades and eye-blinks which cause changes in electrooculograms; facial, jaw, tongue, glottal, and skeletal muscle movements which generate electromyograms, as well as heart beats with accompanying changes in the electrocardiogram. These exogenous components are roughly 50 microvolts in amplitude; however, they may be removed from the cortical signal by source-site measurements and inverse filtering.

ADVANTAGES OVER PRIOR ART

The present invention estimates in real-time the mental decision made in response to a known stimulus from the corresponding single-event evoked, transient, cerebral potential. The accuracy of the present invention has proven to be in the 98% to 87% range for computer simulation studies at realistic cortical signal-to-noise levels. This accuracy results from the ability of the present invention to classify a single-event, transient, cerebral response potential at such low signal-to-noise levels.

The present invention attains these high accuracy levels by combining a direct form, parametric model used in control-system identification with a numerical analysis solution technique to isolate the cerebral response; and by using a non-linear regression analysis technique to classify the decision.

The solution method used by the present invention is based on a mathematical model of the cerebral potential as the output of an autoregressive, moving average filter for the cortically deterministic and stochastic sources within the brain, where the stimulus is an exogenous input.

The present invention computes a set of internal cerebral-driver signals for all cortically deterministic sources that can possibly be evoked by the stimulus from the measured event averaged potentials for the corresponding responses.

The present invention uses a unique recursive procedure to solve the mathematical filter-model of the cerebral potential. The recursive procedure is derived from the Newton's method of numerical analysis for solving a system of non-linear equations. The procedure computes the attenuating values used by the moving average filter-component to produce the measured cerebral potential from in turn each of the internal cerebral driver sources which are possible for the stimulus. The procedure is highly successful at low cortical signal-to-noise levels.

The present invention uses a multiple-layered, feed-forward artificial neural network to identify the decision made from the attenuator-values computed for the set of possible responses to the stimulus.

The present invention tracks the cognitive state of the human operator from the power spectrum of the autoregressive coefficients computed by the recursive procedure to describe the electroencephalogram.

The present invention computes the reliability of the estimated decision from the tracked cognitive state using an expert system with an embedded knowledge on cognitive functions.

The present invention, by measuring the cerebral potential in time with the operant orientation of the user onto a displayed stimulus, may be used for the mental control of computerized visual or aural display functions.

STATEMENT OF THE INVENTION

A primary object of the present invention is to estimate a cognitive decision made in response to a known external stimulus from the corresponding single-event evoked cerebral potential, where the stimulus is typed by a definite task context. The evoked potential is generated naturally within the brain in response to the occurrence of the external stimulus and the mental processing that follows. The amplitudes and latencies of certain waveform components of evoked potentials are influenced by the properties of the stimulus and the resulting mental processing. The present invention is applicable to the translation of single event potential recordings into real-time machine commands for the human control of complicated systems by mental thought when the operator is under a demanding cognitive work-load.

Another object of the present invention is for the unintrusive measurement of cognitive functions as part of a training or testing regimen. For example, the present invention may be used to measure the levels of subject training and workload in human factors studies. In this process, the present invention estimates the cognitive decision made in response to a visual or aural display. The decisions estimated by the present invention are compared to those that would be expected during those parts of the tasks where no operant responses are performed.

A further object of the present invention is to unintrusively monitor the state of a trained human operator for fatigue when he is performing display interaction tasks. In this process, an increase over time in the number of differences between the estimated and expected responses to display stimuli may indicate fatigue. In this way, the present invention may be part of an electronic safety net to detect degradation in operator performance on computerized tasks.

A still further object of the present invention is for use in high workload to aid cognitive functions during display interaction for maintaining both task performance and situation awareness. A discrepancy between the estimated and expected response during the performance of a scripted task would call for the display of a cognitive aid; similarly, a discrepancy in recognizing a situational cue would call for further elaboration by aiding. In this way, the present invention may be used as a component of an electronic "intelligent" human-computer interface for adaptive automated aiding of cognitive functions.

Still another object of the present invention is to control computerized machinery from a visual or aural display. The present invention estimates the mental decision made to either activate or not a task related function associated with a display cue. In this process, the function may be activated for a positive decision without operant confirmation by the operator. The present invention may be used for the human operator control of computerized machines and computer games, and as an aid to the paraplegic handicapped.

Still other objects and advantages of the present invention will become readily apparent to those skilled in this art from the detailed description, wherein only the preferred embodiment of the present invention is shown and described, simply by way of illustration of the best mode contemplated of carrying out the present invention. As will be realized, the present invention is capable of other and different embodiments, and its several details are capable of modifications in various obvious respects, all without departing from the present invention. Accordingly, the drawings and descriptions are to be regarded as illustrative in nature, and not as restrictive.

These and other objects are achieved by providing an invention used to control computerized machines, from an electronic video display with an embedded eye-tracker, by eye-gaze alone. Some examples of such machine control are: (1) updating computer generated information displays, (2) selecting panel switches and instruments, (3) controlling the viewing direction of remotely located cameras, (4) controlling the movement of teleoperated robotics platforms or vehicles, (5) designating targets from direct sight or from a sensor display, and (6) weapon system pointing.

The present invention applies to computer controlled panel or head mounted video and aural displays used in manned crew-stations such as helicopters, aircraft and other manned vehicles; display overlays on video returns in a control station for teleoperations of unmanned remote vehicles and platforms; and displays in communication, command and control stations such as modem air-traffic control or military tactical operations centers. Similarly, the present invention applies to head mounted displays used by an individual who while netted electronically into a data distribution system is performing standalone tasks such as assembly work, maintenance, or soldiering on the modern battlefield. These include computer controlled visual or aural overlays in head-mounted video displays used for virtual reality, stereographics, monocular or binocular vision, and image enhancements for night vision.

DETAILED DESCRIPTION OF THE PREFERRED EMBODIMENT

Figure 1:
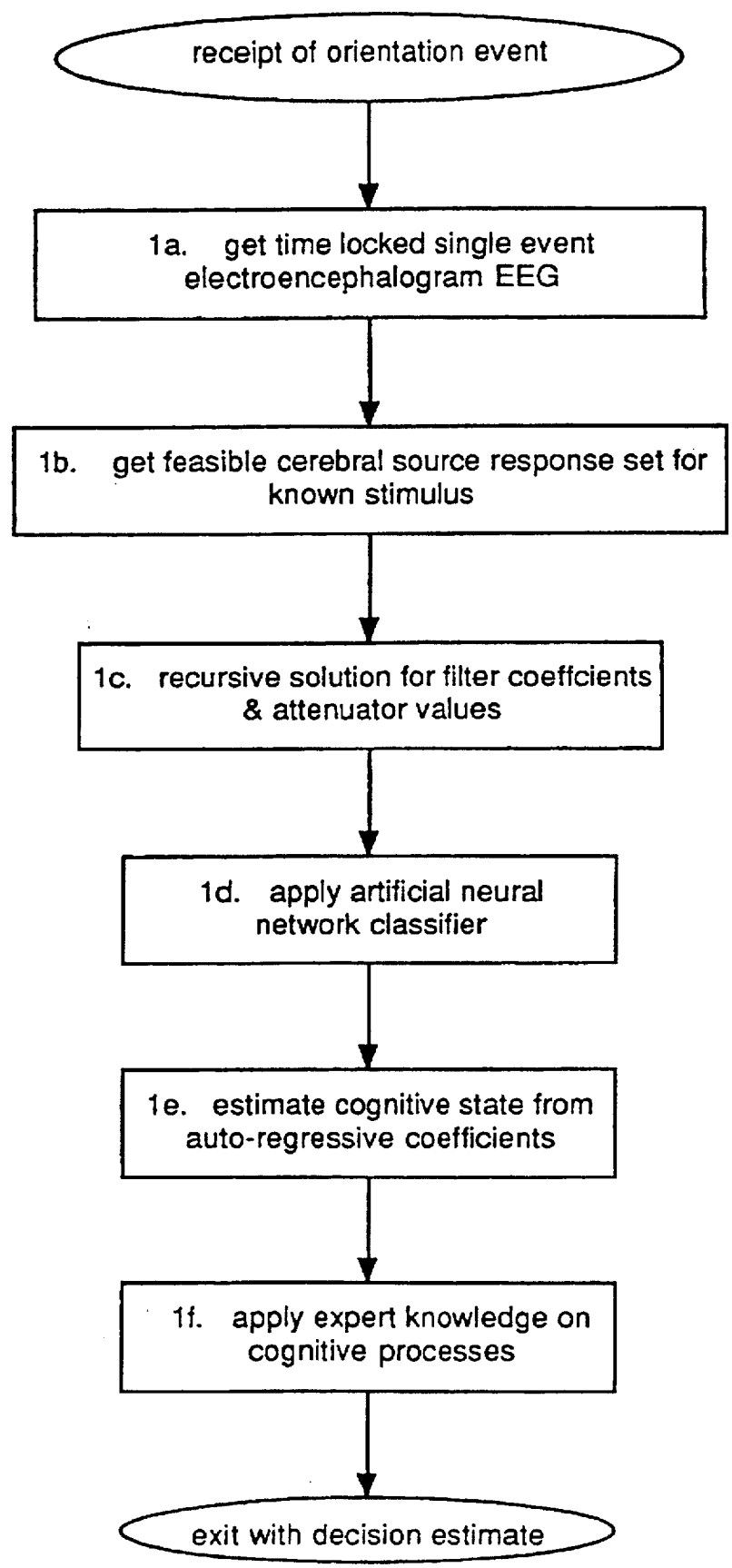
FIG. 1 is a flowchart of the method for estimating a single event decision from the cerebral potential response to a stimulus.

Referring now in detail to the drawings wherein like parts are designated by like reference numerals throughout, there is illustrated in FIG. 1 a flowchart of the process by which the present invention estimates the decision made. First, the recorded cerebral potential is corrected for artifacts, and aligned (1a) in time with the operant orientation onto the stimulus and windowed to form a data sample. Next, the evocable set of internal cerebral driver sources for the stimulus is selected (1b) where the set contains all sources that uniquely correspond to the possible decision-responses to that type of stimulus for the task being performed. Then the coefficients of a moving average, autoregressive filter for the recorded cerebral potential are computed (1c) recursively in turn for each of the possible internal cerebral driver sources. Note that the moving average filter component in the model is a simple attenuator and the corresponding coefficient is an attenuating value for a cerebral source signal. The recursively derived attenuator-values, computed for all possible cerebral sources, are the inputs (1d) to an artificial neural network, where the outputs are the possible set of decisions which can be made in response to the known stimulus. The strongest output of the classifier exceeding a threshold is selected as the best estimate of the decision made. Finally, an expert system determines (1e) the cognitive state from the power spectrum of the autoregressive coefficients. The reliability of the estimated decision is then computed (1f) from an expert knowledge of cognitive processes.

Figure 2:
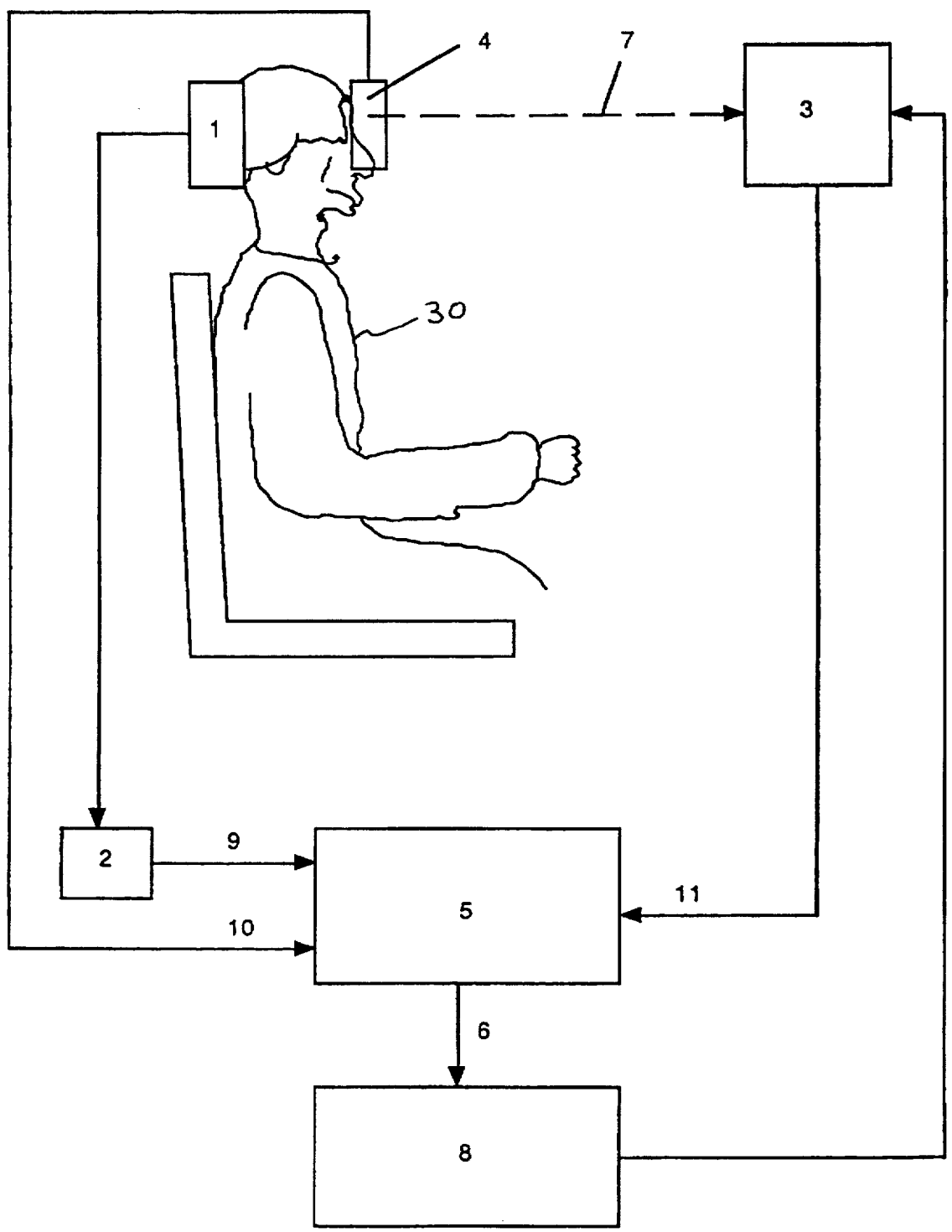
FIG. 2 is a schematic showing the hardware of the present invention.

The present invention, as shown in the schematic of FIG. 2, consists of the following components: an array of analog biosignal amplifiers 1 with analog electrical outputs, a digital signal processor 2 for determining the electroencephalogram of person 30 with analog electrical inputs connected to the outputs of the amplifiers 1, and digital electrical output 9, a stimulus driver 3 with digital electrical output 11, an operant behavior recorder 4 indicating orientation onto the stimulus, with digital electrical output 10, and a digital computer 5 with digital electrical inputs connected to the outputs of the stimulus driver 3, the operant recorder 4, and the digital signal processor 2, with the digital output 6 of the estimated decision and reliability.

The biosignal amplifier array 1 contains instrumentation amplifier modules with inputs connected to skin-surface electrodes. An array of scalp-surface electrodes measures the electroencephalogram; another array of skin surface electrodes (not shown in the figure) measures the electrooculogram, electromyograms and electrocardiogram for artifact corrections. In a further embodiment, the scalp-surface electrodes used to measure the EEG are in a multiple array configuration with an indifferent electrode and amplifier ground. The electrode array is centered about the central and parietal cerebral scalp sites to reduce artifacts from extracerebral sources while maximizing reception of the cerebral potentials.

Several electrodes are used to measure pertinent Electromyographic (EMG) signals generated by the facial, shoulder, and arm muscles. These Electromyograms are measured using skin surface electrodes in a bipolar configuration which are adhered to the skin over the appropriate muscle sites. The Electrocardiogram (EKG) is measured with an augmented unipolar electrode Einthoven's triangle chest cluster with amplifier ground, a configuration commonly used with exercising subjects. Finally, the Electrooculogram (EOG) is measured with a periocular electrode array about the eyes, with two electrodes located horizontally at opposing temporal cnthi sites, and two more electrodes located vertically at opposing sites one above the eyebrow and the other below an eye.

The digital signal processor 2 continually estimates the electroencephalogram (EEG) from the electrical outputs of the biosignal amplifier array 1, following corrections for cerebral artifacts with the electrooculogram, electromyograms and electrocardiogram. The analog voltage outputs from the instrumentation amplifiers 1 for the skin surface electrode measurements are electrical inputs to a multiplexed analog-to-digital converter of the digital processor 2. The digital processor performs several filtering operations on these signals to extract the corrected electroencephalogram. First, the digitized cerebral signals are inputs to a programmable estimator filter in series with a predictor filter with an output which is the positive input to a digital summer. Next, the digital outputs for the extracerebral signals from the modular 1 are input to an array of programmable estimator filters and predictor filters in series with outputs which are the corrective inputs to the digital signal summer. This design results in the cerebral artifacts being removed from the EEG signal following the inverse filtering of the site measurements. Finally, the output of the summer is the corrected electroencephalogram; this output from the processor 2 is the digital electrical input 9 to computer 5.

The stimulus driver 3 controls the presentation of the stimulus to be processed by the human operator. As examples, the stimulus driver may be a visual display driver or an aural controller for a sound speaker system. The driver activates a control line 11 during presentation of a stimulus with the control line holding information as to the type of the stimulus for the task.

The operant recorder 4 records the observable behavior of the human operator as it pertains to the state of the stimulus driver 3. In particular, the recorder 4 records when the operator initially orients onto the stimulus and when information processing is completed. The recorder activates a control line 10 during the information processing period of the stimulus.

The stimulus driver 3 and the operant behavior recorder 4 need to operate in compatible human sensory modalities. As an example, the figure shows a visual display as the stimulus driver 3 and an eyetracker as the operant behavior recorder 4; the eyetracker determines when the eye-gaze 7 of the human operator is directed onto the visual display cue serving as the stimulus.

The digital computer 5 computes an estimate of the human-operator's decision for the stimulus from the EEG recorded during the information processing stage. The computer output 6 is the estimated decision. In application, the output may in turn be used in a feedback loop to control the stimulus to the operator. For example, FIG. 1 shows that the digital output 6 from the computer 5 is an input to a host computer 8 which is controlling the stimulus driver 3.

Figure 3:
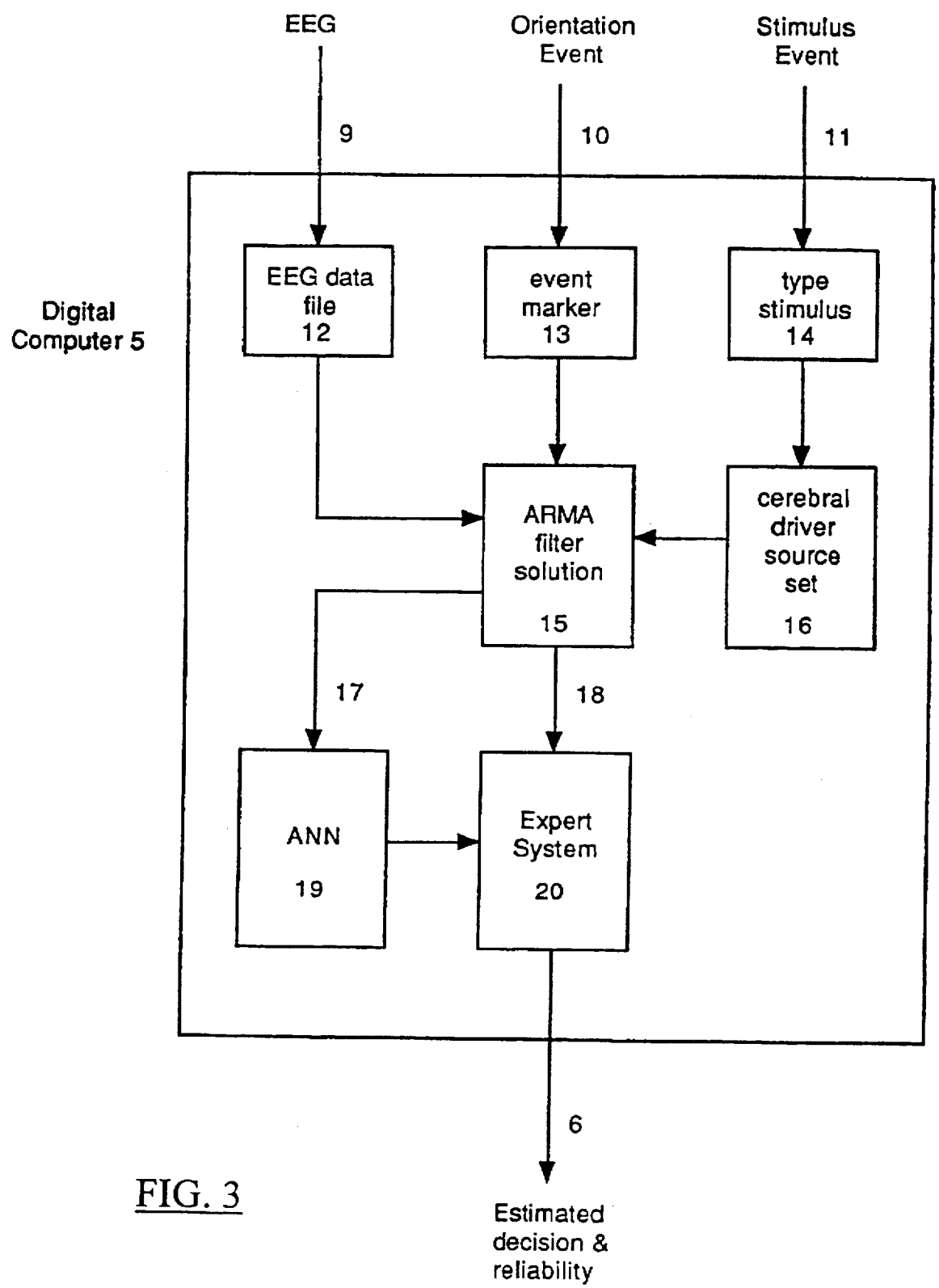
FIG. 3 is a flowchart of the computer software of the present invention.

The software routines for the digital computer 5 are flowcharted in FIG. 3, as follows: a routine 12 reads the electroencephalogram (EEG) output of the digital processor 2 from input 9, and saves it in a data file; an interrupt service routine 14 which upon receipt of a control line pulse 11 from the stimulus driver 3 flags the set of internal cerebral driver sources 16 evocable by the stimulus-type for the task being performed; an interrupt service routine 13 which upon receipt of a control line pulse 10 from the operant recorder 4 notifying of an orientation onto the stimulus, forms a cerebral potential sample from the windowed EEG data and activates estimation of the resulting sample; a routine 15 that when called by routine 13 recursively solves for the coefficients of an autoregressive, moving average filter model of the cerebral potential where the moving average filter component is a simple attenuator, and calls for classification; the routine solves the model in turn for each of the possible cerebral driver sources 16 which are evocable by the stimulus 11 as flagged by the routine 14; the routine saves the computed attenuator-values 17 and the autoregressive coefficients 18; a routine 19 for an Artificial Neural Network (ANN) that when called by routine 15 estimates the decision made from the attenuator-values 17, and calls for an expert evaluation of the estimate; and a routine 20 for an expert system that when called by routine 19 estimates the mental state from the autoregressive coefficients 18 and from an embedded knowledge base on human cognitive processing computes a reliability judgment for the decision estimate.

Figure 4:
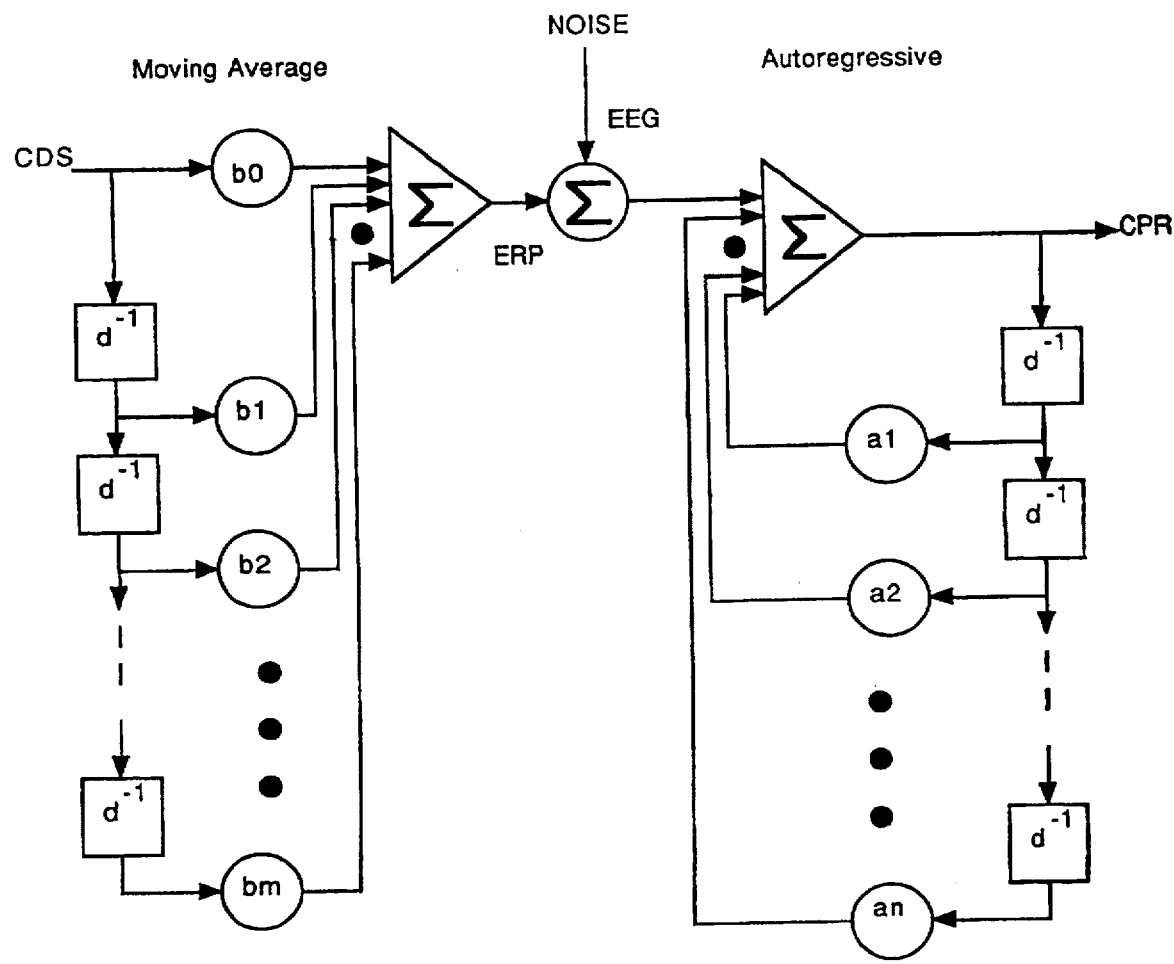
FIG. 4 is a schematic of the autoregressive, moving average filter model for the cerebral potential.

The recursive method used in software routine 15 to compute the filter model coefficients and the corresponding attenuator values, is an essential step in the unique functioning of the present invention. The solution method is derived from a realistic model of the cerebral potential, which is now described. As shown in FIG. 4, the potential is mathematically the output of an autoregressive, moving average filter embedded in the cerebrum, with the stimulus as an exogenous input. The recorded cerebral potential (CPR) consists of a single event, evoked response potential (ERP) added to the background electroencephalogram (EEG).

The ERP is generated in response to the stimulus by a cerebral driver source (CDS) which is located within the brain as a deterministic input to the moving average component of the filter. The ERP is a variation of the event averaged response potential, a template response by the CDS which is particular to the stimulus. However, the coefficients for the moving average filter change values with cognitive changes to produce the variation in the single event response. In a further embodiment, the moving average filter is restricted to a shunting attenuator with the filter coefficient, b0, equal to the attenuation and the remaining coefficients equal to zero.

In contrast, the background electroencephalogram (EEG) is the sum of signals generated by multiple various and sundry sources within the brain which are continually occurring in a random manner uncorrelated to the stimulus. For this reason, the multiple sources of the background EEG make up a stochastic process which act as a random noise source. The output of this noise source is summed with the moving filter output to form the input to an autoregressive filter, the output of which is the recorded cerebral potential (CPR). The coefficients of the autoregressive process reflects the mental state for cognitive processing, and therefore the ability to actively respond to stimuli and make decisions.

The development of the solution method from this filter model is now described. Referring back to FIG. 4, the recorded cerebral potential (CPR) is the sum of the evoked response potential (ERP) and the background electroencephalogram (EEG). In equation form, the K th sample of the recorded cerebral potential, here denoted by cpr[K], is given by the prior n samples, the cerebral driver source potential, cds[K], the stochastic noise source, e[K], and the ARMA filter coefficients, {b0,b1, . . . , bm, a1,a2, . . . ,an}, as follows:

$$cpr[K] = b0^*cds[K] + b1^*cds[K-1] + b2^*cds[K-2] + \ldots + bm^*cds[K-m] + a1^*cpr[K-1] + a2^*cpr[K-2] + \ldots + an^*cpr[K-n] + e[K], \quad (1)$$

where the filter in general is composed of a mth order moving average filter expanded by a shunting attenuator with coefficients {b0,b1, . . . , bm}, and an nth order autoregressive process with coefficients {a1,a2, . . . , an}. The equation applies to all the Nth samples in the recording from the start to the end of the evoked response (K=0,1, . . . , N−1), where for samples before the stimulus event (K<0), the cerebral source potential is zero and the potential recordings are the background electroencephalogram.

Essential to the mathematical development outlined above is the concept of the cerebral driver sources (CDS) for the event stimulus; these cerebral source potentials are computed from the corresponding event averaged potential (EAP). The event averaged potential is determined by averaging a large number of cerebral potential measurements, each time locked to the repetitively evoking stimulus. In actuality, the underlying single event response potential (ERP) will be a variation of the average response throughout the data collection process. However, the background electroencephalogram signal being the product of a stochastic process, should over many repetitive trials average to zero. The above equation form reduces, for the averaging process, to:

$$eap[K] = b0*cds[K] + a1*eap[K-1] + \\ a2*eap[K-2] + \ldots + an*eap[K-n], \quad (2)$$

where the assumption is made that all the moving average coefficients are equal to zero except the direct shunt coefficient (b0) which is set to unity. The equation applies to the entire sample for K=0,1, . . . ,N−1; the evoked averaged response is zero for samples before the stimulus event (K<0).

The equation may be inverted to find the internal cerebral driver source potential (CDS) in terms of the corresponding event averaged potential (eap), given the values of the ARMA filter coefficients $\{b0,a1,a2,\ldots,an\}$. The resulting equation, constituting a form of inverse filtering, is as follows:

$$cds[K] = (eap[K] - a1*eap[K-1] - \\ a2*eap[K-2] - \ldots - an*eap[K-n])/b0, \quad (3)$$

where b0=1. The autoregression coefficients $\{a1,a2,\ldots,an\}$ are determined by analysis of a recording prior to the evoking stimulus; the background electroencephalogram tends to remain stochastically stable over a 10 to 20 second period.

The single event evoked response potential (erp) for the stimulus event may be generated in turn from the cerebral driver source and the filter coefficients. Noting that the cerebral potential recording (cpr) is the sum of the evoked response potential (erp) and the background electroencephalogram, equation 1 reduces to:

$$erp[K] = b0*cds[K] + b1*cds[K-1] + \ldots + bm*cds[K-m] + \\ a1*erp[K-1] + \ldots + an*erp[K-n], \quad (4)$$

where erp[0]=0 is an initial condition. Classical analysis of waveform peak amplitude and latency may then be performed on the computed single event evoked potential. The equation applies to the entire sample for K=0,1, . . . ,N−1; the evoked response and the cerebral driver source potential are both zero for samples before the stimulus event (K<0).

The above method may be used to identify the evoked response to a stimulus. Given a cerebral potential recording time-locked to the event, the moving average autoregressive filter coefficients could then be solved using equation 1 by the least squares method for each of the cerebral source potentials in turn that correspond to the feasible set of event averaged potentials as determined by equation 3. Equation 1 may be solved for the filter coefficients using stochastic least squares techniques given the cerebral driver source potential (cds) and the cerebral potential recordings (cpr). Since the noise sources are uncorrelated, maximum likelihood techniques reduce to the least squares solution for the filter coefficients. The sets of filter coefficients, or the equivalent waveform amplitudes and latencies from equation 4, for each of the feasible source potentials may then used as an ordered input to a classification procedure.

The accurate computation of a complete set of parameters by the direct solution method is difficult to obtain at the low signal to noise ratios commonly found with cerebral potentials. For this reason, the approach used for the present invention is instead to use the above equations to develop a recursive scheme that forces a response choice from the potential recordings. Essentially, the moving average filter is restricted to a shunt attenuator of the cerebral driver source with the filter coefficient equal to the attenuation. A recursive procedure is developed, which when applied to the potential recordings, forces the attenuation to either unity implying passage of the selected driver source, or a value close to zero implying rejection. In this manner, the attenuator value is used as a "flag" to indicate the identity of the potential response from the set of feasible event averaged response templates through the corresponding cerebral driver sources.

The recursive procedure is developed in the following. Equation 1, describing the entire sample (for K=0,1, . . . , N−1), mathematically forms a system of non-linear equations in the unknown variables consisting of the filter coefficients and the N number of cerebral driver source potentials. The equation is made nonlinear by the products of the moving average filter coefficients and the cerebral driver source potentials. An iterative method of solving such a set of equations is the Newton's method for nonlinear systems, which depends upon the Jacobian matrix constructed from the partial derivatives of the equations with respect to the variables. The method is expected to give quadratic convergence provided that sufficiently accurate starting variable values are selected and the inverse of the Jacobian matrix exists at the solution.

The iteration procedure consists of a series of steps where for each step first the system of equations, F(g)=0, and the Jacobian matrix, J(g) derived from that system, are solved using the vector approximation, g, to the unknown variables. A correction, z, to the vector approximation is then computed from the linear system of equations formed from the Jacobian matrix and the system matrix, J(g)z=−F(g). The approximation to the vector of unknown variables is then updated with the correction, g=g+z, and the procedure is repeated until the norm of the correction vector is sufficiently small in value.

This approach is applied to a simplified version of equation 1 reduced to a first order moving average and autoregressive filter with corresponding coefficients (b, a), without lose of generality. In this case, the Kth function of the system of equations, for the ith iteration, reduces to:

$$f(g_i(K))=y(K)-b_i*x_i(K)-a_i*y(K-1)-e(K) \quad (5)$$

where here the notation is such that the variable y(K) represents the Kth cerebral potential recording and the unknown variables for the ith iteration are the estimate of the cerebral driver source represented by $x_i(K)$, the moving average coefficient, $b_i$, and the autoregressive coefficient, $a_i$, that is, $g_i=\{a_i, b_i, x_i(K)\}$. Notice that the product term, $b_i*x_i(K)$, renders this equation non-linear. The corresponding kth row of the Jacobian for this system of equations is given by the partial derivatives of the kth function by the unknown variables, that is, $J(g_i(K))=\{-y(K-1), x_i(K), -b_i\}$. Following the procedure described above, the correction vector, $z_i=\{\alpha_i, \beta_i, \chi_i(K)\}$, is found by solving the following set of equations:

$$\alpha_i * y(K-1) + \beta_i * x_i(K) + b_i * \chi_i(K) = \\ y(K) - b_i * x_i(K) - a_i * y(K-1) - e(K), \quad (6)$$

for all K=0 to N−1. The approximation for the next iteration is then given by the equations:

$$a_i + 1 = a_i + \alpha_i, \\ b_i + 1 = b_i + \beta_i, \text{ and} \\ x_i + 1(K) = x_i(K) + \chi_i(K). \quad (7)$$

Note that equation 6 for the ith iteration reduces to the following form, $$y(K)=b_i+1*x_i(K)+a_i+1*y(K-1)+bi*\chi_i(K)+e(K) \quad (8)$$

that is, the approximations to the filter coefficients for the next iteration may be solved directly without computing the correction components at each iteration.

However, in general, this set of equations cannot be solved mathematically since there is a different value to the correction for the cerebral driver source, $\chi_i(K)$, for each equation in the set; therefore there are more variables than equations and the solution vector is indeterminate. This set of equations has a solution if it can be augmented with an additional equation for $\chi_i(K)$, which in turn is related to the filter coefficient, $b_i$. In this case, however, the iterative process may not converge for starting variable values distant from the solution, but instead may lead to an instability in the variable computations. For this reason, the correction, $\chi_i(K)$, is expressed as a Taylor's series expansion in terms of the moving average filter coefficient, b, , about the solution value ($b_i = b_i^\circ$), $$\chi_i(K/b_i) = \chi_i(K/b_i^\circ) + \chi_i'(K/b_1^\circ) \epsilon_i \quad (9)$$

where the expression is approximated by the first two terms consisting of the correction value at the solution and the linear change in the correction with change in the filter coefficient, $b_i$, from the solution value. This latter term is the product of the partial derivative (denoted by ') at the solution, and the departure of the filter coefficient from the solution value, $\epsilon_i = b_i - b_i^\circ$.

Consider first the case where the correct cerebral driver source corresponding to the evoking stimulus, is selected as a starting approximation for equation 8. In this case, the correction to the cerebral driver equals zero, that is, $\chi_i(K)=0$, and the corresponding filter coefficient, $b_i=1$. Furthermore, since the product term, $b_i * \chi_i(K)=0$, equation 8 reduces to equation 1 and the updates to the falter coefficients may be computed by the least means squares. The result should be a stable solution with the moving average filter coefficient, $b_i$, remaining at unity; this is the solution filter coefficient value, that is, $b_i^\circ=1$. Furthermore, the correction value at the solution, $\chi_i(K/b_i^\circ)=0$. Using the ratio of correction value to filter coefficient as a rough measure of the correction derivative, the Taylor's series expansion for the cerebral driver source correction reduces to the following expression as a first order approximation, $$\chi_i(K) = (1-b_i) * x_i(K)/b_i \quad (10)$$

where the term $x_i(K)/b_i$ is a measure of the rate of change of the correction and $\epsilon_i = 1-b_i$ is the linear change in the filter coefficient, $b_i$, from the unity value. Finally, equation 10 shows that the iterative update to the cerebral driver source is:

$$x_i + 1(K) = x_i(K)/b_i \quad (11)$$

which applies in general.

Consider next the case where an incorrect cerebral driver source is selected as a starting approximation for equation 8. Now, again elect to solve equation 1 using the least means square method, in place of equation 8 for the filter coefficient updates, by setting the product term, $b_i^* \chi_i (K)=0$. Next, equation 10 may be used to compute the update to the cerebral driver source. However, the resulting iterative procedure, using first equation 1 and then equation 10 in a two step process, leads to an unstable solution for the cerebral driver source which then drives the moving average filter coefficient, $b_i$, to zero. For, the cerebral source correction, $\chi_i(K)$, should be different from zero, and therefore the choice of $b_i^* \chi_i(K)=0$ in equation 8 implies that $b_i=0$. In turn, equation 11 shows that the approximation to the cerebral driver source will grows without bound since $x_i + 1(K) = x_i(K) b_i$. However, note that the product term $b_i^* x_i(K)$ in equation 1 remains finite, since while the moving average filter coefficient, $b_i$, is driven to zero, the approximation to the cerebral driver source is driven to infinity.

This mathematical development provides the basis for the recursive solution method used by the present invention to solve for the filter coefficients and the corresponding attenuating values. Referring back to the software routines of computer 5, the solution method used in software routine 15 is flowcharted in greater detail in FIG. 5. Given the single event cerebral potential recording, the first feasible stimulus response for the stimulus is selected (5a) along with the corresponding cerebral driver source (5b). The method then enters an iterative two-step procedure, by first solving equation 8 (5c) for the coefficients of the auto-regressive, moving average filter, where the moving average filter component is limited to a shunting attenuator. This is followed by solving equation 10 (5d) to update the estimate of the cerebral driver source. The values computed at every iterative cycle (5f) for the moving average filter coefficient, $b_i$, are recorded (5e) as a measure of the attenuation. This iterative procedure is repeated (5g) for each cerebral driver source (derived from the corresponding event averaged responses by equation 3) in the set of feasible responses. Here, a value of $b_i$ close to unity implies passage of the selected driver source by the moving average filter while a value dose to zero implies rejection. The computed values of the filter coefficient for each driver source, are then used in a classifier as described below. Note that the Least Means Square (LMS) method of solving equation 8 in step 5c is readily implemented as flowcharted in FIG. 6. The solution vector for the coefficients is computed from a normal equation using a data vector made up of the cerebral potential recordings and a state matrix from these recordings and the signal values for the cerebral driver source.

Figure 7:
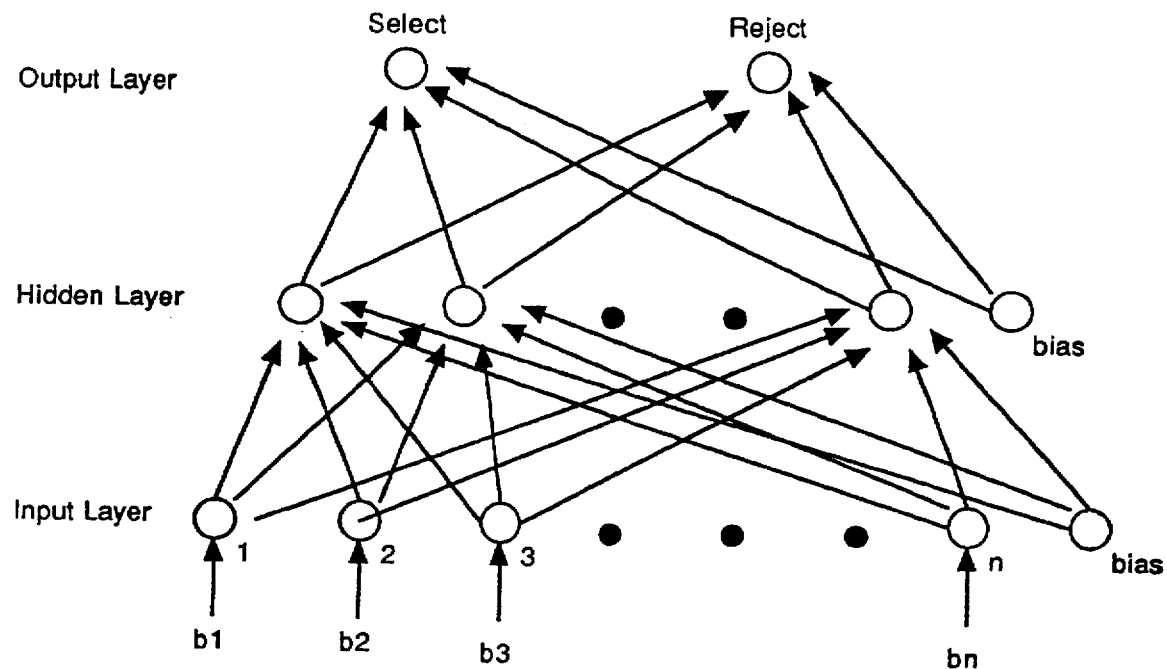
FIG. 7 is a schematic of the artificial neural network architecture.

The present invention uses an artificial neural network (ANN) as a discriminant function for representing the statistics of the decision making process in software routine 19. In a further embodiment, the present invention uses the Rumelhart's feed-forward, back-error propagation system (Rumelhart, D. E., McClelland, J. L., & The PDP Research Group [1988], "Parallel distributed processing", Cambridge, Mass.: The MIT Press, describes artificial neural network theory and practice). This system is a layered architecture that contains a layer of input nodes, one or more hidden layers of intermediate nodes, and a layer of output nodes as shown in FIG. 7. In addition, a bias node, providing a constant reference value, is part of each hidden layer and the input layer. Each node of one layer is fully connected to the nodes of the succeeding layer. The inputs (b1,b2, . . . , bn) flow forward from layer to layer to the outputs during recall.

The typical Rumelhart's feed-forward, back-propagation network has at least one or two hidden layers. Some work has been done which indicates that a maximum of three hidden layers can be used to solve arbitrarily complex classification problems. However, the number of nodes required in the hidden layers increases with the complexity of the relationship between the inputs and the outputs. Most back-propagation networks have one or two hidden layers, with the number of hidden layer nodes somewhere between the total number of input and output processing nodes.

The concept of the processing node is essential to the functioning of the network. The output of a node in the inner or outer layers is a function of the weighted inputs. The inputs to the node are the outputs from the nodes in the lower layer which are weighted by the strengths of the interconnections. The weighted sum for the input is applied to an activation function which produces an activation level for the node. In turn, the activation is passed through a transfer function to produce the node output. In most cases, the activation function is just the weighted sum of the node inputs. Further, the transfer function is commonly the nonlinear sigmoid function with low and high saturation limits of zero and one.

The network is trained by a supervised back-propagation method which in propagating the output error for a training set of known inputs and outputs back through the network, adjusts the connection weights so as to minimize the error. This is accomplished by first forward propagating the input through the hidden layers to the output layer, then determining the error at the output layer, and finally propagating the errors back through the network from the output layer to the input layer. The changes in the connection weights are computed for the output and hidden layer nodes from the node errors. In this way, each time a particular input and desired output is introduced for training, the back-propagation algorithm modifies the connection weights to reduce that particular output error.

Figure 8:
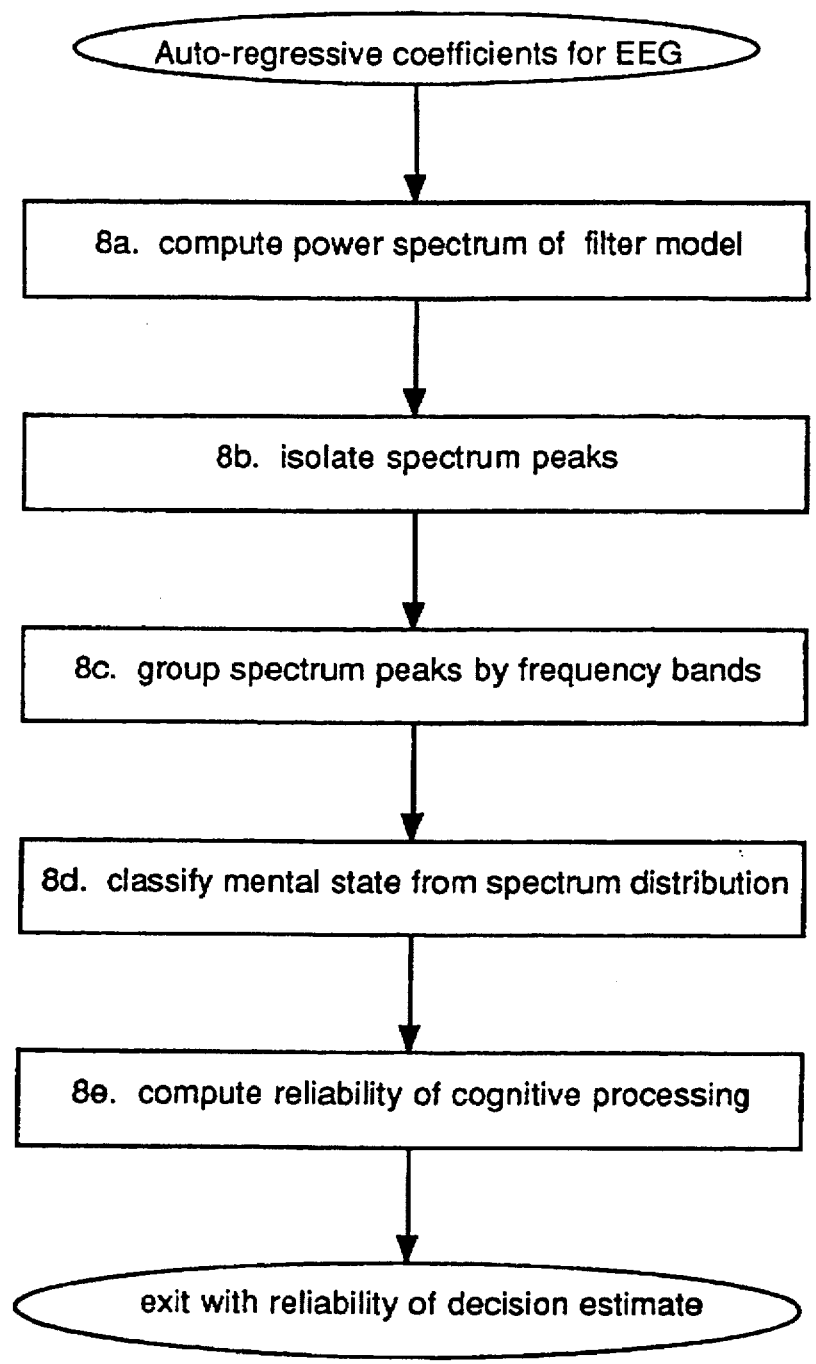
FIG. 8 is a flowchart of the expert system routine used to judge the reliability of the decision estimate.

The present invention uses an expert system in software routine 20, to judge the reliability of the decision made from the auto-regression coefficients for the electroencephalogram as flowcharted in FIG. 8. The expert system consists of two cascaded stages in series, a front-end, short-time spectrum analyzer followed by a fuzzy logic processor. The analyzer first computes (8a) the power spectrum for the frequency response of the autoregressive filter producing the EEG from the corresponding autoregressive coefficients. The analyzer then determines (8b) the spectral peaks with a peak-picking algorithm and groups them by the frequency bands of the power spectrum that are sensitive (8c) to the states of mental alertness for cognitive processing. The resulting power frequency distribution is then transformed (8d) into an estimate of the cognitive state by the fuzzy logic classifier, and from that a measure (8e) of reliability for cognitive processing is derived from fuzzy logic rules. The selection of cognitive sensitive frequency bands for state membership classification and the reliability rules for cognitive processing are derived from an expert knowledge of cognitive processes.

The expert knowledge for membership classification of the cognitive processing state from the power spectrum analysis is based on the following. In general, the electroencephalogram as recorded from the surface of the scalp, consists of slow rhythmical waveforms that varies between 10 and 100 microvolts in amplitude and from 0.5 up to 100 Hertz in frequency. In conventional analysis, the normal frequency range of the electroencephalogram (0.5 Hz to 30 Hz) is subdivided into five rather broad frequency bands: delta (0.5–4 Hz), theta (4–8 Hz), alpha (8–13 Hz), beta (13–22 Hz), and the gamma (22–30 Hz) band. The human mental state has been shown to vary with the distribution of signal power among these frequency bands.

For example, in most normal adult subjects, the EEG is made up of rhythmic oscillating waves with a basic frequency of about 10 hertz from the alpha band (8 to 13 hertz). Typically this alpha wave oscillation has an amplitude of 50 microvolts peak-to-peak, although in about 10 percent of the population it is absent or very small. The alpha waves are best recorded from the scalp at the back of the head over the occipital lobe and over the tertiary frontal area, and are strongest when the subject is relaxed, awake and resting quietly with the eyes closed. The waves are reduced or blocked when the eyes are opened and attention is concentrated.

In particular, the alpha rhythm responses to mental activity for when a subject perform a task such as arithmetic the rhythm is attenuated leading to alpha suppression. In this process, the alpha waves are replaced by irregular gamma waves of lower voltage and higher frequency which are often associated with information processing. This alpha blockage by gamma waves is even more pronounced when the subject is excited or started. On the other hand, as the subject becomes drowsy, the alpha rhythm is reduced and replaced with the slower, higher amplitude delta rhythm.

The more rapid rhythmic and smaller beta waves characterize the normal EEG which is recorded from the scalp regions over the central (precentral and postcentral sensorimotor areas) and frontal brain (secondary frontal area). These beta waves are associated with the sensory and motor functions of the brain, and they are blocked (i.e., desynchronized) by voluntary movements in a manner similar to the blocking of the alpha rhythm by eye opening. In addition, hippocampal theta rhythm is associated with arousal and activity.

For certain situations, the relationship between cognitive performance and the power spectrum is better measured by a finer division of the frequency range into narrower bands. For example, a recent study showed that the measure of vigilance performance is limited to a few relatively narrow-bands near 4 and 14 Hertz, which lie in the delta and beta bands, respectively. Presumably, the delta component measures the degree of drowsiness while the beta component measures the degree of attention to the task. In contrast, the study showed that little relationship existed at frequencies near 10 Hertz in the alpha band and above 17 Hertz in the higher beta and in the gamma bands.

The fuzzy logic processor uses this expert knowledge of the assignment of the spectrum peaks to the frequency bands for different mental states to perform membership classification on the computed spectrum distribution. That is, a pattern in the EEG of irregular, rapid waves with low amplitude correspond to alert, excited, and emotional states; regular, slower, and higher amplitude waves appear for relaxed states; and even larger and slower fluctuations appear when the subject is drowsy. Thus, the level of arousal from low to high can be inferred from the pattern of EEG activity. In a further embodiment, the member classes are: "drowsiness", "relaxed", "attentive", and "excited". The "drowsiness" state has a predominance of spectrum power in the delta band and the "relaxed" state in the alpha. The "attentive" state shows alpha suppression with strong components in the beta and gamma bands. Finally, the "excited" state has a predominance of power in the gamma band. The measured power spectrum will be distributed across these frequency bands.

In turn, the fuzzy logic rules judge the most likely cognitive state to be that of attentiveness, and least likely those of the end extremes, drowsiness or excitement. This is based on experiments that have shown that performance is greater at the intermediate levels of arousal than at the low and high arousal states. The processor parses the fuzzy rules selecting the maximum for a judgment of the reliability of the mental state for cognitive functioning.

In another embodiment, the membership classification is made following application of the non-parametric method known as the Kullback Leibler-Nearest Neighbor (KL-NN) Rule in place of the spectrum analysis. The method uses the predictive residuals from the fit of the EEG to the autoregression processes for samples representative of the different member classes. The residuals are computed from the quadratic products of the coefficient vectors and the correlation matrix for the EEG sample.

In a still further embodiment, the reliability from software routine 20 along with the estimated decision coded by the classifier output node and the corresponding strength of the output from routine 19, as well as a measure of the operant orientation, are the inputs to a third stage of the expert system. This stage serves as a non-parametric classifier such as the Fisher's Linear discriminant function where an estimated decision is only recognized if the value of the generalized Rayleigh's Quotient for the discriminant exceeds a threshold value. In this embodiment the present invention continually tests for a cognitive decision by using a global set of cerebral driver sources which contain all possible responses to the set of stimuli for the tasks to be performed. Furthermore, the present invention may now be used to continually track the cognitive state since it registers on cognitive events independent of the specific stimulus. Of course, various embodiments of the expert system and decision classifiers are possible. For example, the reliability from the expert system could be an input to the artificial neural network along with the set of attenuator-values for the moving average filter; the output must exceed a threshold value for the estimated decision to be recognized.

An automatic calibration method is used to compute certain user-specific constants for the filter functions of digital signal processor 2, determine the event average response potentials for the recursive solution method of software routine 15 in computer 5, and to train the artificial neural network of routine 19. In this method, the user first performs a sequence of muscular activities for brief periods while cerebral and artifact signals are measured to establish record files for artifact analysis. This sequence is as follows: (1) no activities for EKG, (2) tracking movements for EMG, (3) facial and head movements for EMG, and (4) finally visually tracking for EOGs. A set of regression analyses are then performed on the signal measurements to determine the parameters of the estimating and smoothing filters needed to isolate the electroencephalogram from the cerebral artifacts.

The viewer next responds to a series of stimuli displays for which he has been instructed to make specific decisions while his operant responses, skin surface potential measurements and decision responses are recorded. The potential measurement data are then used to construct event average evoked potentials for the decision responses as follows. For each decision response the electroencephalogram is corrected for the artifacts using estimating and smoothing filtering and then the electroencephalogram is time-locked to the operant response. Finally, the electroencephalograms for equivalent decisions are event averaged to estimate the average evoked potentials for the different decision cases.

Figure 9:
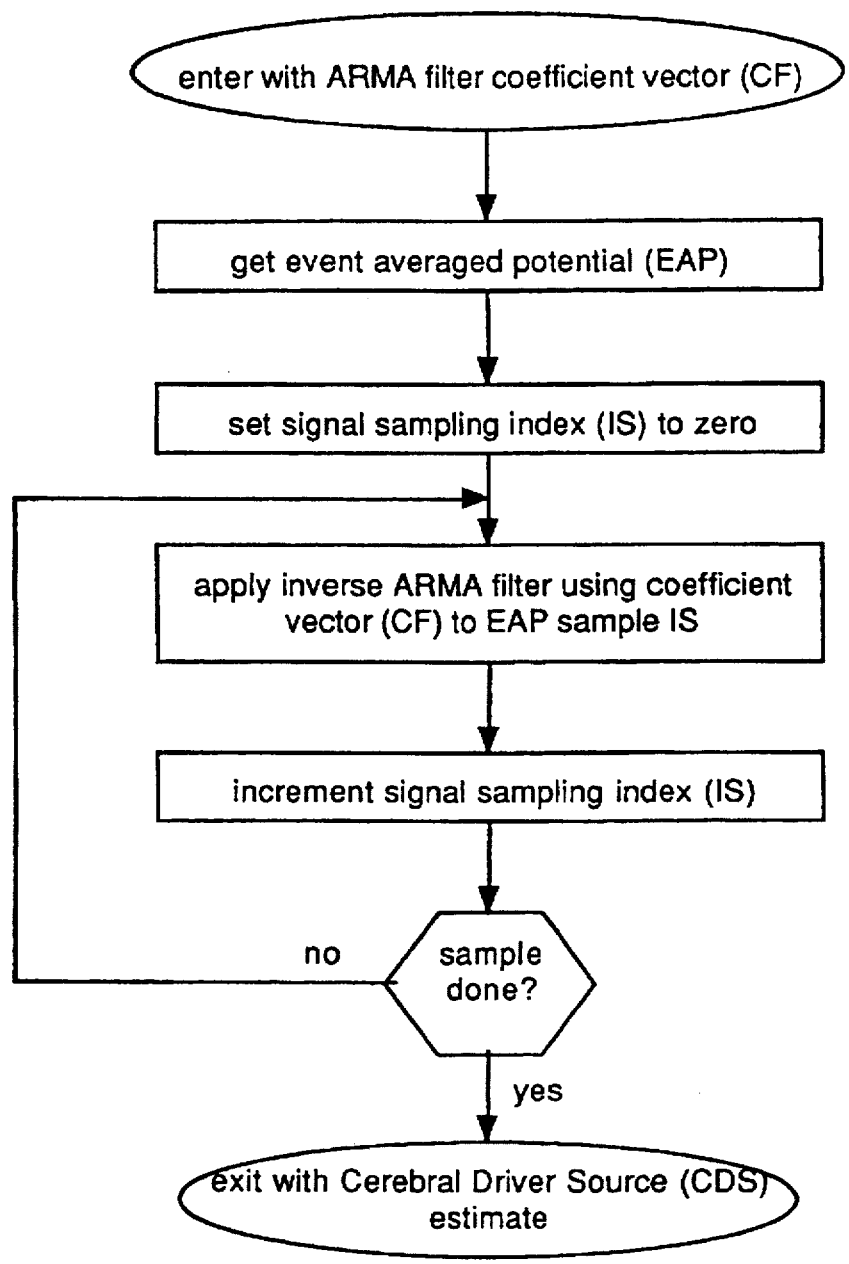
FIG. 9 is a flowchart of the routine used to compute the event averaged cerebral driver sources.

The cerebral driver sources for the display stimulus are determined from the average evoked potentials and the corresponding autoregressive coefficients using the method flowcharted in FIG. 9. The autoregressive coefficients are computed from the EEG data header to the stimulus events, and again from the data tail for checking to ensure stochastic stability. The cerebral driver sources are computed with Equation 3 from the autoregressive coefficients and the corresponding event average potentials. The attenuator-values are then computed with the recursive solution method for each test case from the corresponding single event cerebral potential and the set of driver sources.

The data set consisting of the attenuator-values for the single event cerebral potentials and the corresponding decision responses, is used to train the artificial neural network. The values of the network weights appropriate for the classification problem are established during a supervised training period. The network is trained by a back-propagation method in which the weights are adjusted using the difference in the actual output to the desired output for each training input set. Initially, the weighting factors for the connections are set randomly. During the training phase, the weights are adjusted so that the difference between the output and a test answer supplied by the training routine is minimized. As training progresses, the weights assigned to each interconnection between the processing nodes are iteratively changed so as to minimize the error to the desired answer.

Referring back to FIG. 2, the figure shows that the digital output 6 from the computer 5 of the present invention may be placed as an input to a host computer 8 which is controlling the stimulus driver 3 of task-relevant stimuli. In this configuration, the present invention, by time-locking the electroencephalogram with the operant orientation of the user onto the controlled stimulus, may be used for the applications of mental control to computerized visual or aural display functions. The present invention estimates the mental decision made in response to the displayed stimulus. The host computer, during those parts of the task when no operant responses are performed, then compares the estimated decision to that which would be expected from a preprogrammed script which dictates a sequence of stimuli and expected responses for the completion of the task. The script may include display choices for user feedback that may vary with the degree of disagreement between the expected and the estimated decision. The complexity level of the script design can determine the type of application supported by the present invention.

For example, the present invention may be used for the unintrusive measurement of cognitive functions as part of a training or testing regimen. In this process, the host computer would merely record the estimated decisions and those dictated by the script for later comparison.

In another application, the present invention may be used to unintrusively monitor the state of a trained human operator for fatigue when he is performing display interaction tasks. In this process, the host computer performs a time trend analysis of the differences between the estimated and expected responses to display stimuli; an increase in the differences over time may indicate fatigue. In this way, the present invention would be part of an electronic safety net to detect degradation in operator performance.

Again, the present invention may be used during high workload to aid cognitive functions in computerized display interaction for maintaining both task performance and situation awareness. A discrepancy between the estimated and expected response during the performance of the scripted task would call for the display of a cognitive aid; similarly, a discrepancy in recognizing a situational cue would call for further elaboration by aiding. In this way, the present invention may be used as a component of an electronic "intelligent" human-computer interface for adaptive automated aiding of cognitive functions.

Still again, the present invention may be used to control computerized machinery from a visual or aural display. The present invention estimates the mental decision made to either activate or not a task related function associated with a display cue. In this process, the function may be activated for a positive decision without operant confirmation by the operator. In this manner, the present invention may be used to control computerized machines by eye-gaze alone from an electronic video display with an embedded eye-tracker. Here, the host computer selects the displayed stimulus for activation that is closest to the eye-gaze location on the display.

The application of the present invention has been successfully demonstrated in a computer replication of an experiment documented in the literature by Gomer, Spicuzza, and O'Donnell (Gomer, F. E., Spicuzza, R. J., & O'Donnell, R. D. [1976], "Evoked potential correlates of visual item recognition during memory-scanning tasks", Phsiological Psychology, 4, 61–65, describes changes in the P300 amplitude and latency of event average potentials in a target recognition task as a function of the response and complexity). The authors investigated the relationship between event average response potentials and the performance of human subjects on a letter recognition task. The subjects in the experiment identified a tachistoscopically displayed letter as being either a member of a learned set or not. That is, the subject when presented with the test stimulus, had to decide whether or not it was one of the letters that had been memorized previously, and make a choice response accordingly ("Positive" for teamed, "Negative" for not learned). The electroencephalogram was recorded during the experiment from the central vertex (Cz in the 10-20 electrode system) of the scalp and referenced to the right mastoid with left mastoid as ground. The authors reported that the P300 amplitude of the event averaged potentials was significantly greater statistically for the learned letters than for the unlearned letters. Furthermore, the amplitude difference increased with the size of the learned letter set. The experiment was a 4 by 2 by 6 repeated measures design representing: size of the learned letter set (one, two, four, or six letters), class of the test stimuli (unlearned or learned set), and subjects as a random variable.

The present invention is used to predict a letter recognition response from a single event electroencephalogram that is synthetically generated in the computer replication of the experiment. A subject in the replication gives a "Positive" or "Negative" response depending upon whether the test stimulus is one of the learned letters or not. The subject is always oriented onto the test stimulus by the nature of the test procedure. The set of possible responses are limited to the two mentioned. The corresponding set of cerebral driver sources is determined from the event averaged response potentials that are reported by Gomer, Spicuzza, and O'Donnell for the subject and the letter set size.

For this purpose, multiple sets of single event electroencephalogram recordings were artificially synthesized from the event average response potentials that were reported for the Gomer, Spicuzza, & O'Donnell's experiment. This was done by mathematically embedding the internal cerebral driver sources that were computed for the event average potentials within synthetically generated electroencephalograms at realistic cortical signal to noise levels. The synthetic electroencephalograms were stochastically generated using autoregressive coefficients which were reported in the literature by Pfurtscheller & Schuy for an awake subject with a dominant alpha-rhythm. The internal cerebral driver sources were computed from the event averaged potentials and the autoregressive coefficients. In this manner, complete sets of single event recordings were artificially generated for each of the subjects on each of the learned letter set sizes of the experiment, over a realistic range of cortical signal-to-noise levels.

Figure 10:
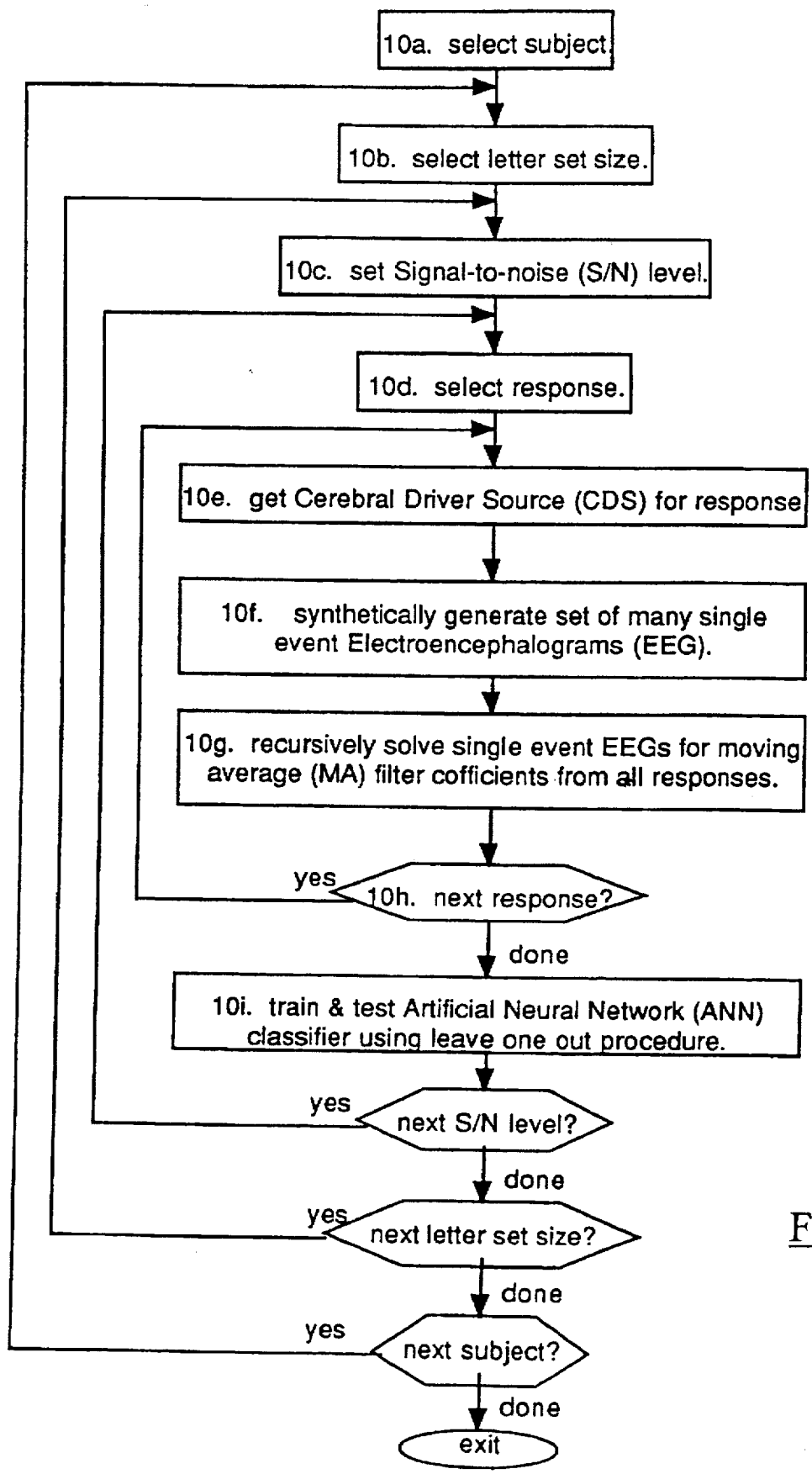
FIG. 10 is a flowchart of the method used to demonstrate the prediction of decision response by computer simulation.
Figure 11:
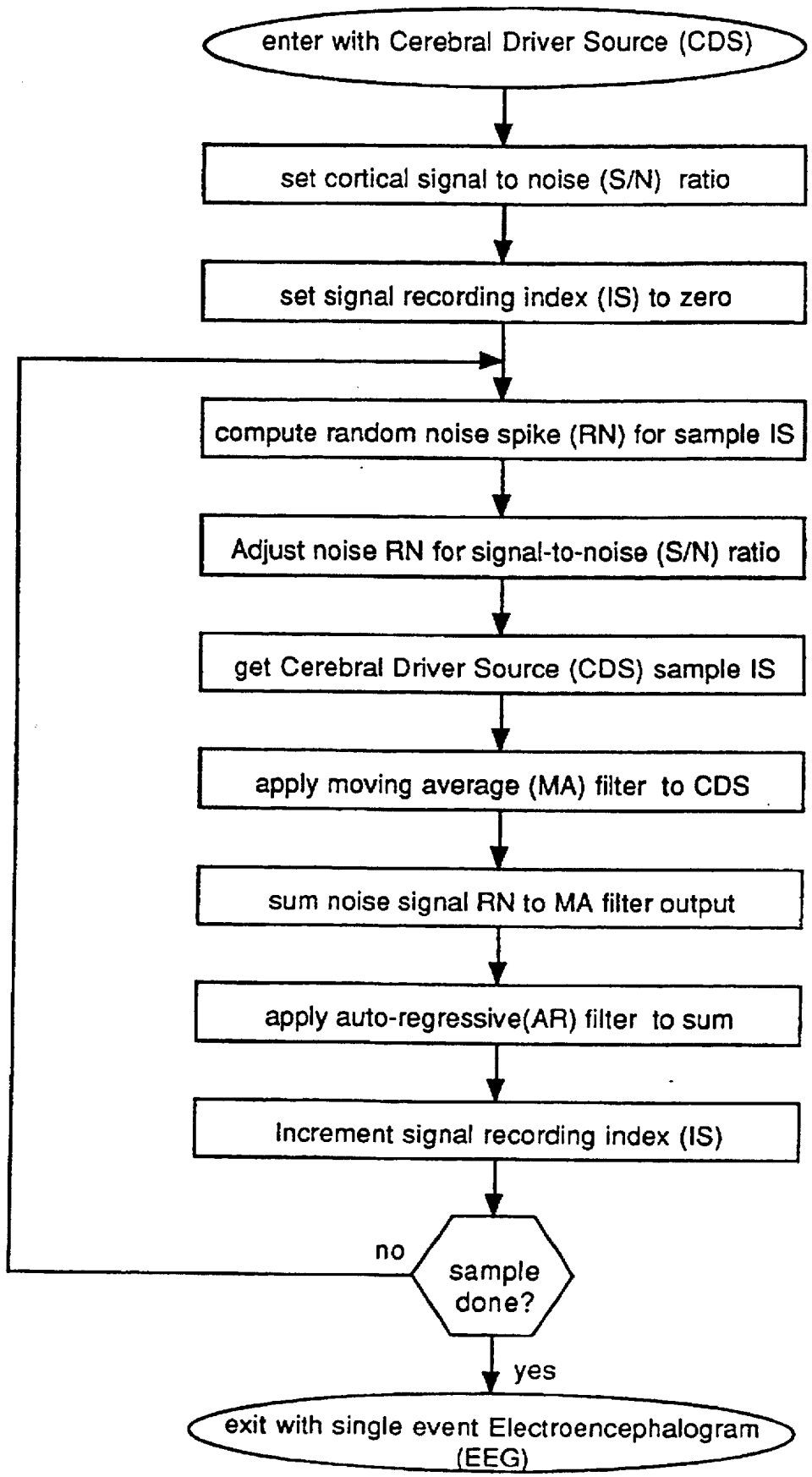
FIG. 11 is a flowchart of the routine used to generate the single event electroencephalograms for the demonstration.

FIG. 10 flowcharts the method used to demonstrate the prediction of the decision responses in greater detail. The selection of a subject (10a) and learned letter set size (10b) from the Gomer, Spicuzza, & O'Donnell's experiment specifies a pair of event average response potentials, one for the subject's "Positive" response and the other for the "Negative" response. As flowcharted in FIG. 11, Equation 1 is used to synthetically generate the single event electroencephalogram at a specified signal to noise (S/N) level (10c) for the first of the two responses (10d) from the corresponding cerebral driver source and the autoregressive coefficients. Note that Equation 3 is used to compute the cerebral driver source (10e) for the event average potential of the selected response as flowcharted in FIG. 9. This synthetic generation (10f) of the single event electroencephalogram is repeated many times to build up a data set by synchronizing the cortical driver source with the repeated stimulus while letting the stochastic sources run freely.

Figure 5:
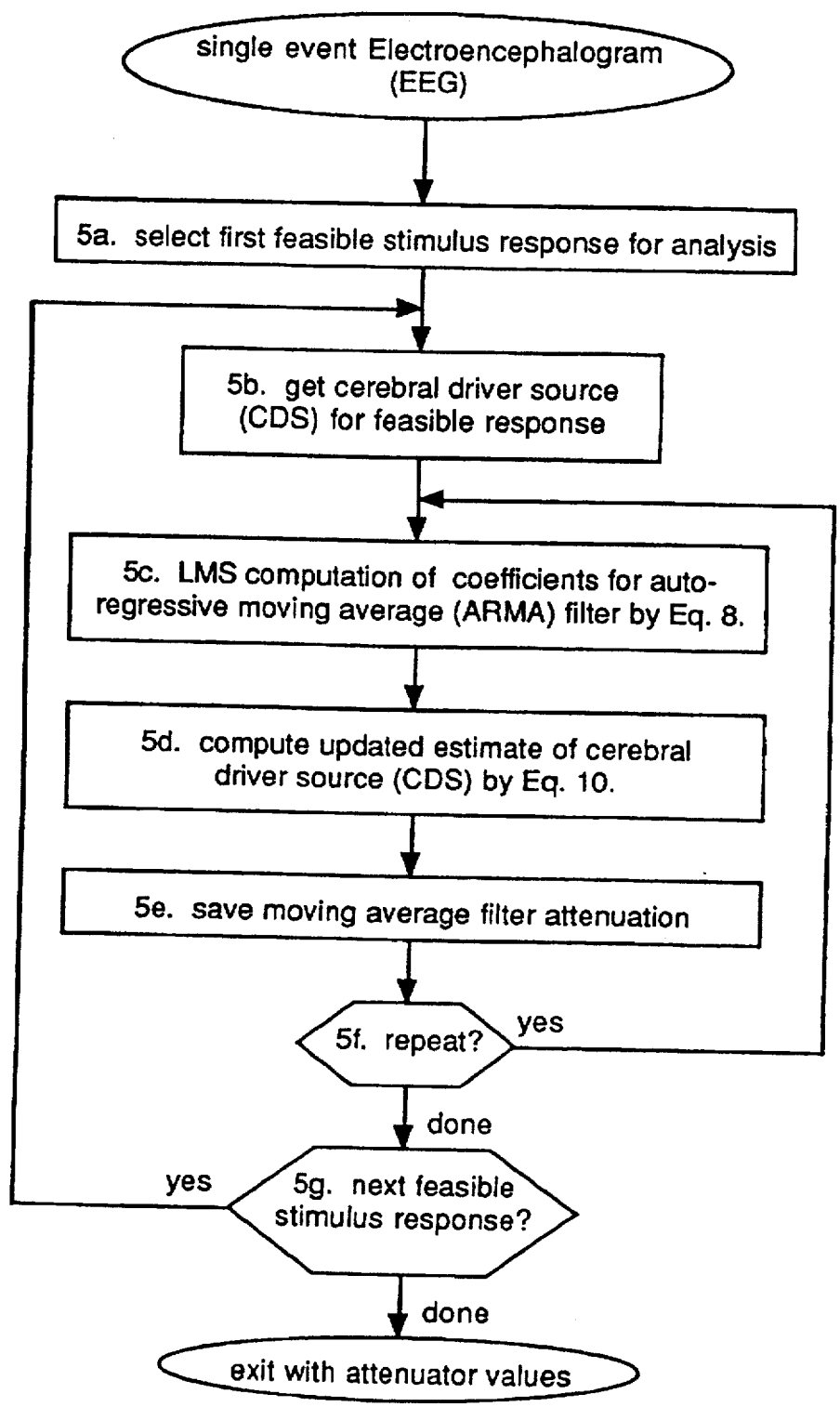
FIG. 5 is a flowchart of the routine used for the single event cerebral potential analysis.
Figure 6:
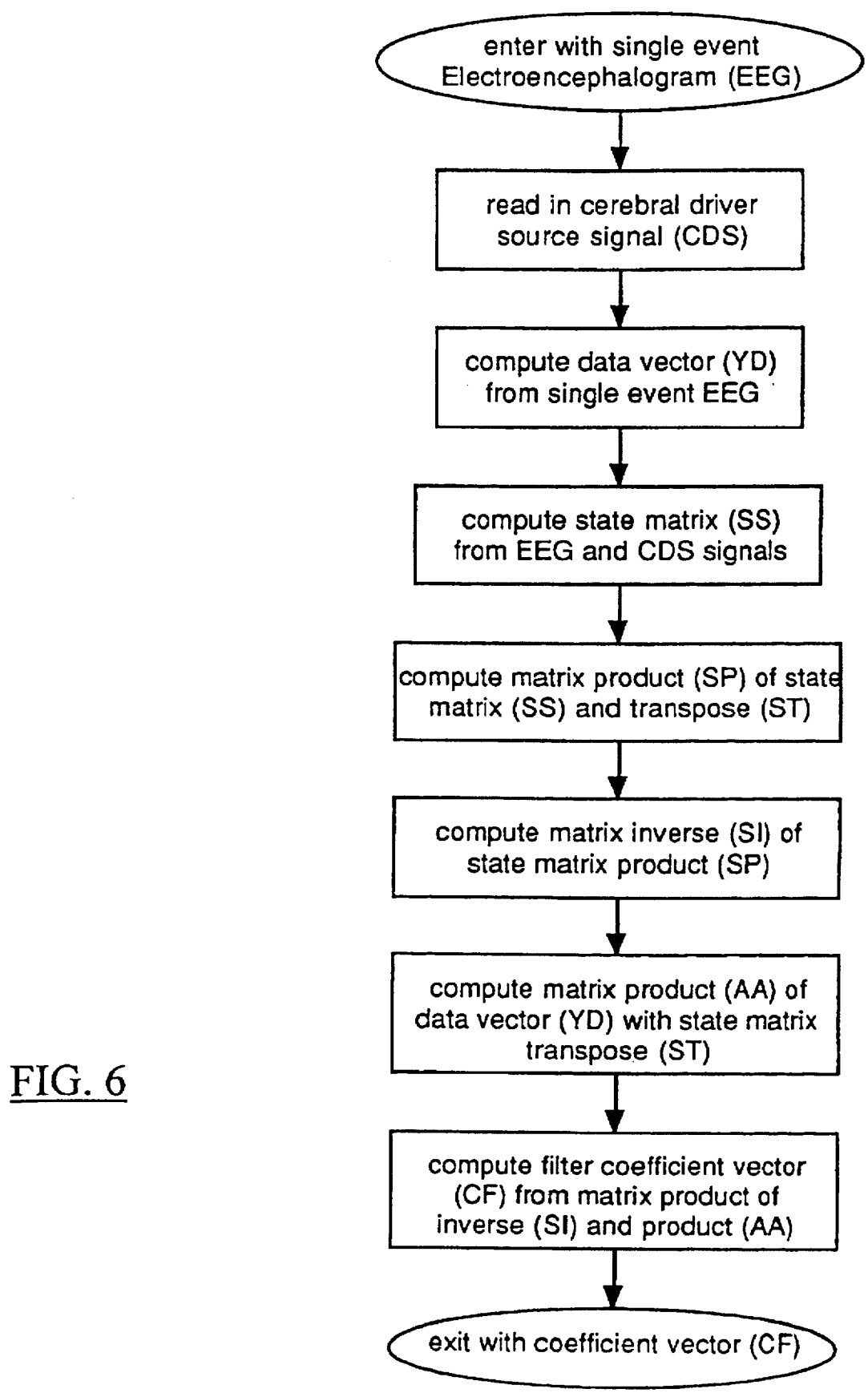
FIG. 6 is a flowchart of the least means square routine used to compute the coefficients of the autoregressive, moving average filter model.

Each of the resulting single event electroencephalograms in the set is then following windowing to a 800-millisecond sample individually analyzed by the recursive method (10g) using equations 8 and 10 as flowcharted in FIG. 5 for the corresponding value of the moving average filter attenuation, with the value being saved on each of the three recursive iterations. The Least Means Square method is used as flowcharted in FIG. 6 to solve for the coefficients of equation 8 from the single event electroencephalogram and a cortical source as a possible solution. This recursive method of analysis is applied to each single event electroencephalogram in turn for each of the two cortical driver sources.

This process is then repeated for the second of the two responses (10h) using the corresponding cerebral driver source and the autoregressive coefficients to synthetically generate the electroencephalogram. Again, this synthetic generation (10e) of single event electroencephalograms is repeated many times. And again, the resulting single event electroencephalograms are each individually analyzed by the recursive method (10g) for the corresponding moving average filter attenuating values. In this way, for each response the set of single event electroencephalograms is transformed into an equivalent lists of vectors, with a separate vector for each single event, where the elements of the vector are the three recursive solutions of the moving average attenuation for each of the two cortical driver sources.

Next, the data sets on the moving average filter attenuation for the two possible responses, are augmented by identifiers for the correct responses and then combined to form a data base for training and testing the artificial neural network for use as a classifier (10i). The artificial neural network used in this study is a three layered, feed-forward network, with an input layer of six processing nodes, a hidden layer of three processing nodes, and an output layer with two nodes. The first three inputs are the values for the moving average attenuation of the cerebral driver source for the "Positive" response at each of the three recursive steps, and the next three inputs are the same for the "Negative" response as solution. The three nodes of the hidden layer each receive outputs from all six input nodes and a bias node. Finally, the two nodes of the output layer each receive outputs from all three hidden layer nodes and a bias node. One output node corresponds to the "Positive" response and the other to the "Negative". Each processing node employs a sigmoid transfer function, which operates on the sum of the node inputs; consequently the inputs are limited in value.

The artificial neural network is trained and tested using the leave-one-out procedure (10i). In this procedure, all but one sample of the data base are used as the training set and the remaining sample is used to test the discriminator. The network is supervisory trained with the epochal pairs of input and output data samples for each application of the leave-one-out procedure. In this training, the weights for the connections between the network nodes are adjusted by the back-propagation delta rule using a learning rate of 0.6 and a momentum term of 0.2. The network is tested on the training every 20 epochs, until an acceptable error level of 0.05 is reached. The network is then tested on the data sample left out. This procedure is repeated for all data samples in turn, and the resulting error rate is a measure of the classification performance. In this way, the ability of the artificial neural network to identify the letter responses from the moving average filter attenuations is tested as a function of the signal to noise ratios.

Figure 12:
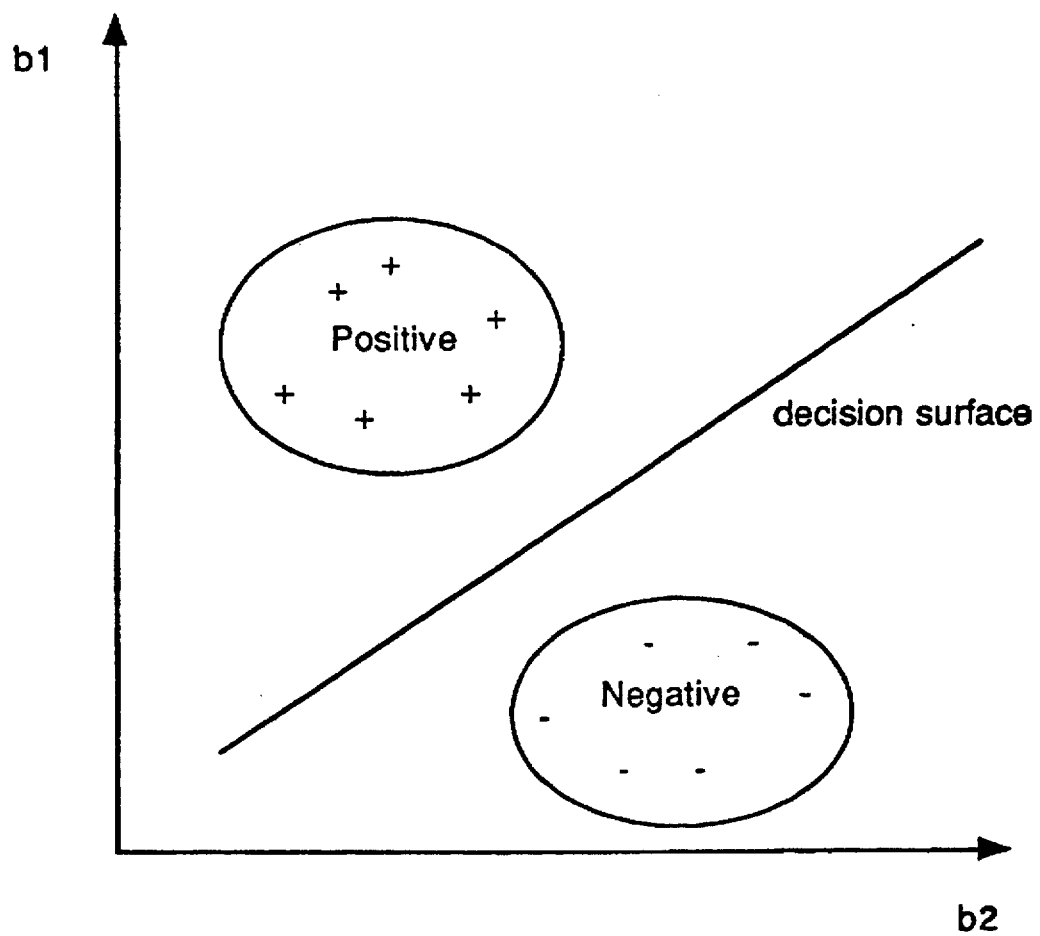
FIG. 12 is a figure showing the classification analysis used in the demonstration.

In this application, the artificial neural network acts as a dual category discriminant function as shown in FIG. 12 dividing the parametric feature set space into a region for the "Positive" response and one for the "Negative" response as the correct choice. The feature set is defined by the moving average attenuations (shown in the figure by only b1 & b2) used to represent the single event cerebral potential response. The discriminant function is determined by the separability of the statistical distributions of the features for the two responses. The function may be thought of as a decision surface separating the two response regions. Further, the discriminant acts as a mapping function reducing the discriminating problem from a multivariable one for the moving average attenuations into a single variable for the choice between the two possible responses. The mapping function maps the multivariable features for the cerebral response to a discriminant dimension where the mapped value is compared to a threshold value. The choice is correct for one response class and incorrect for the other if the discriminant function is greater than the threshold, while the converse is true if not.

Figure 13:
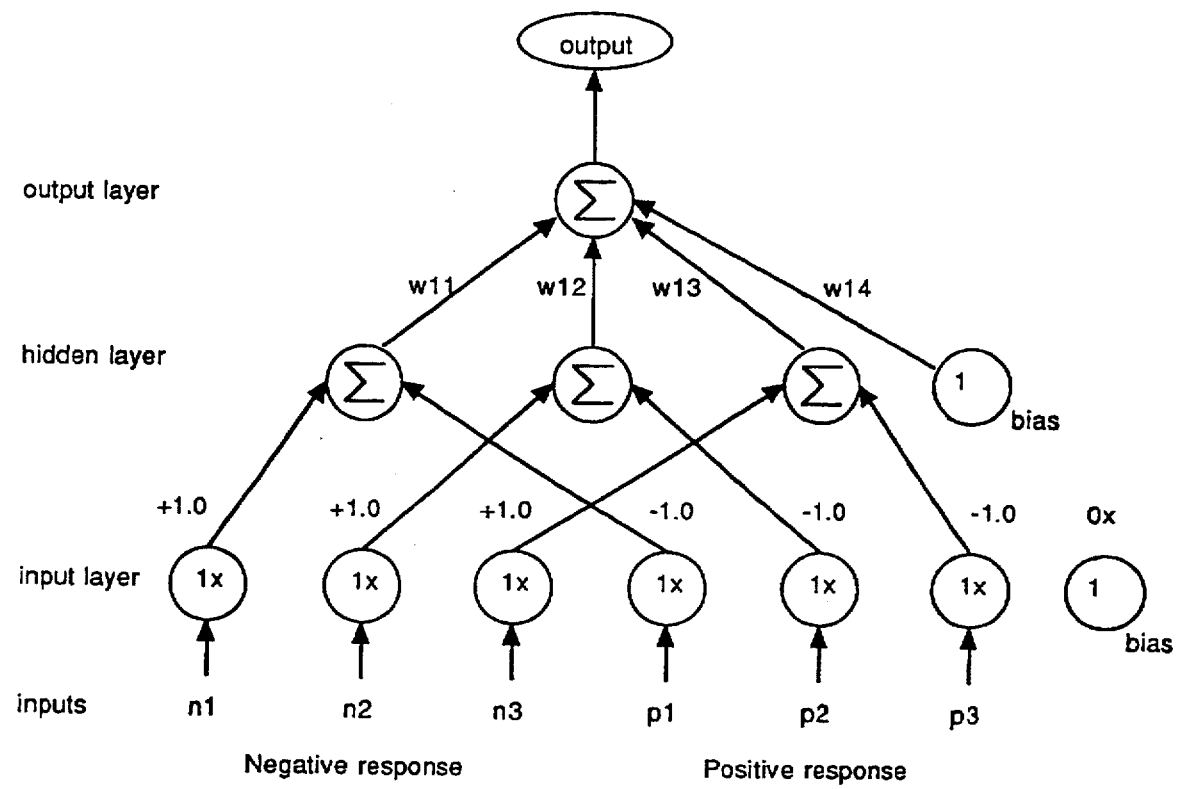
FIG. 13 is a schematic showing the architecture of a representative artificial neural network used in the demonstration.

A close study of the weights for a representative trained network, following linearization of the sigmoid function using the first two terms of the exponential and binomial series expansions, suggests that to a first order approximation, the artificial neural network performs a weighted sum of the differences between the iteratively matched moving average attenuating values for the correct and incorrect responses, and that the summation is weighted more toward the later iterations. FIG. 13 shows the architecture of the representative network with idealized interconnection weights assigned; the bias node at the input layer in the figure provides zero signal to the hidden layer.

Figure 14:
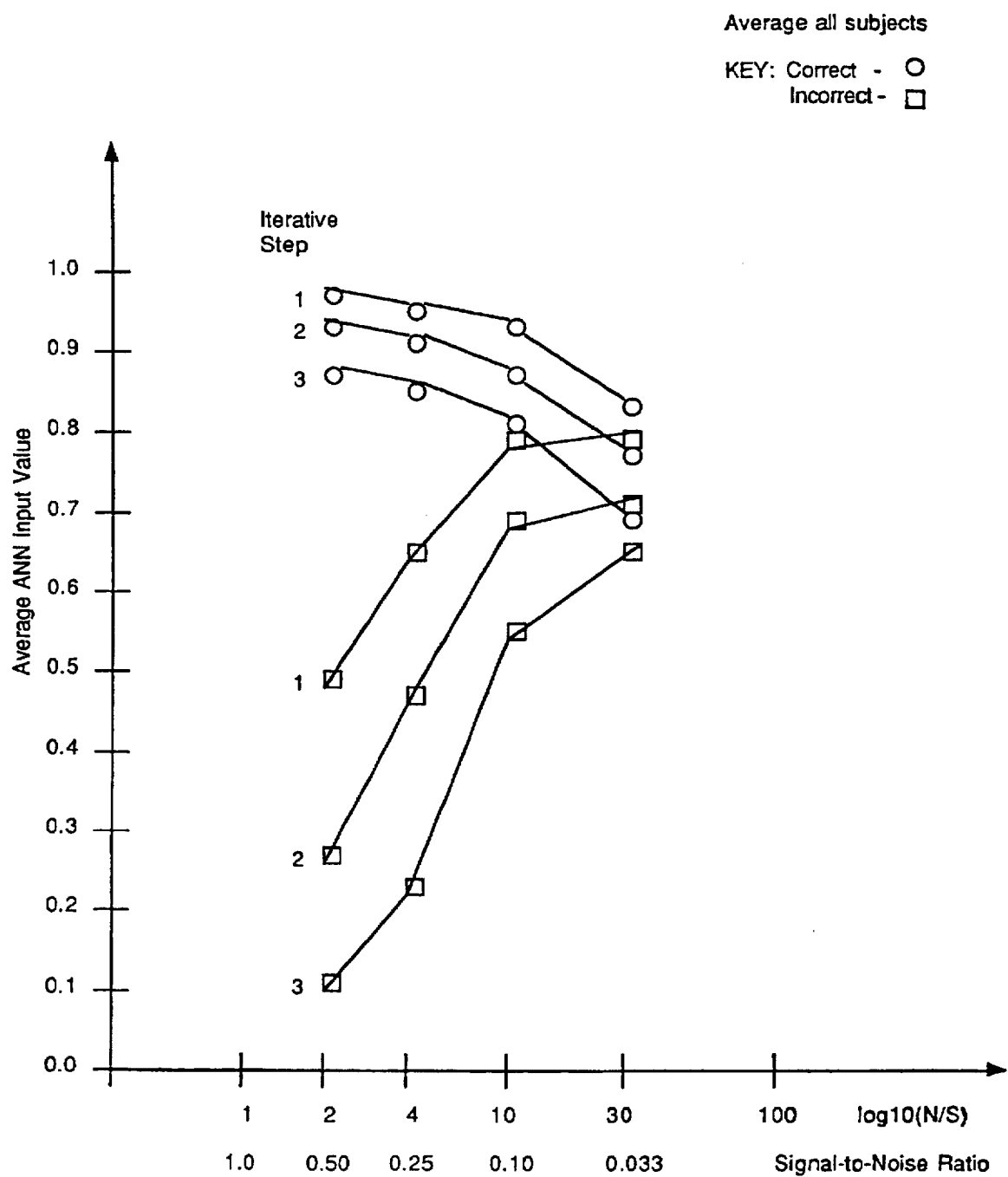
FIG. 14 is a plot of the average input values for the artificial neural network as a function of the cortical signal-to-noise ratio and the recursive iteration step.

Insight into the functioning or the present invention may be gained from a study of the computations for values of the moving average filter attenuation acting as the inputs to the artificial neural network. The average network-input values are shown in FIG. 14 as a function of the signal-to-noise ratio and the iteration of the recursive method. There is little variation in the computations across subjects and letter set sizes. As can be seen from the figure, the average values for the correct response tend to remain close to unity at the higher signal-to-noise ratios. In contrast, the average values for the incorrect response tend to decrease toward zero with increasing iteration. However, as the signal-to-noise ratio is decreased, the averages for the correct response tend to decrease from unity, while those for the incorrect response tend to increase in value. The averages decrease with iteration with the decrease less for the correct response than the incorrect. At the lowest signal-to-noise ratio of 0.033, the averages for the correct and incorrect responses matched for iteration are close in value.

Figure 15:
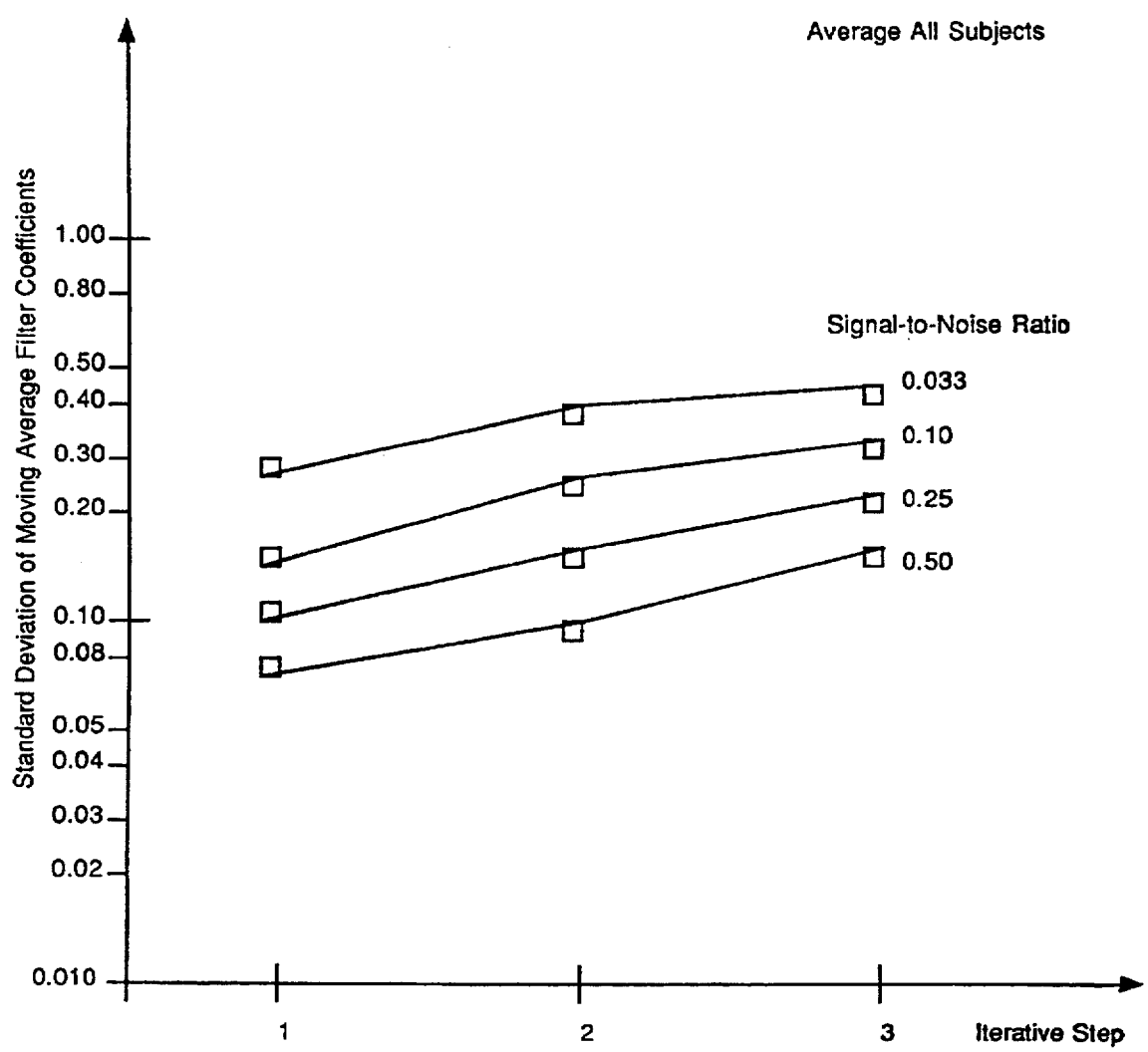
FIG. 15 is a plot of the standard deviations for the network input values as a function of the cortical signal-to-noise ratio and the recursive iteration step.

The standard deviations of the network input values is shown in FIG. 15 as a function of the signal-to-noise ratio and the iteration of the recursive method. The standard deviations in the computed values increases with decreasing signal-to-noise ratio. There is a slight increase in the standard deviation with iteration for the lower signal-to-noise ratios.

Figure 16:
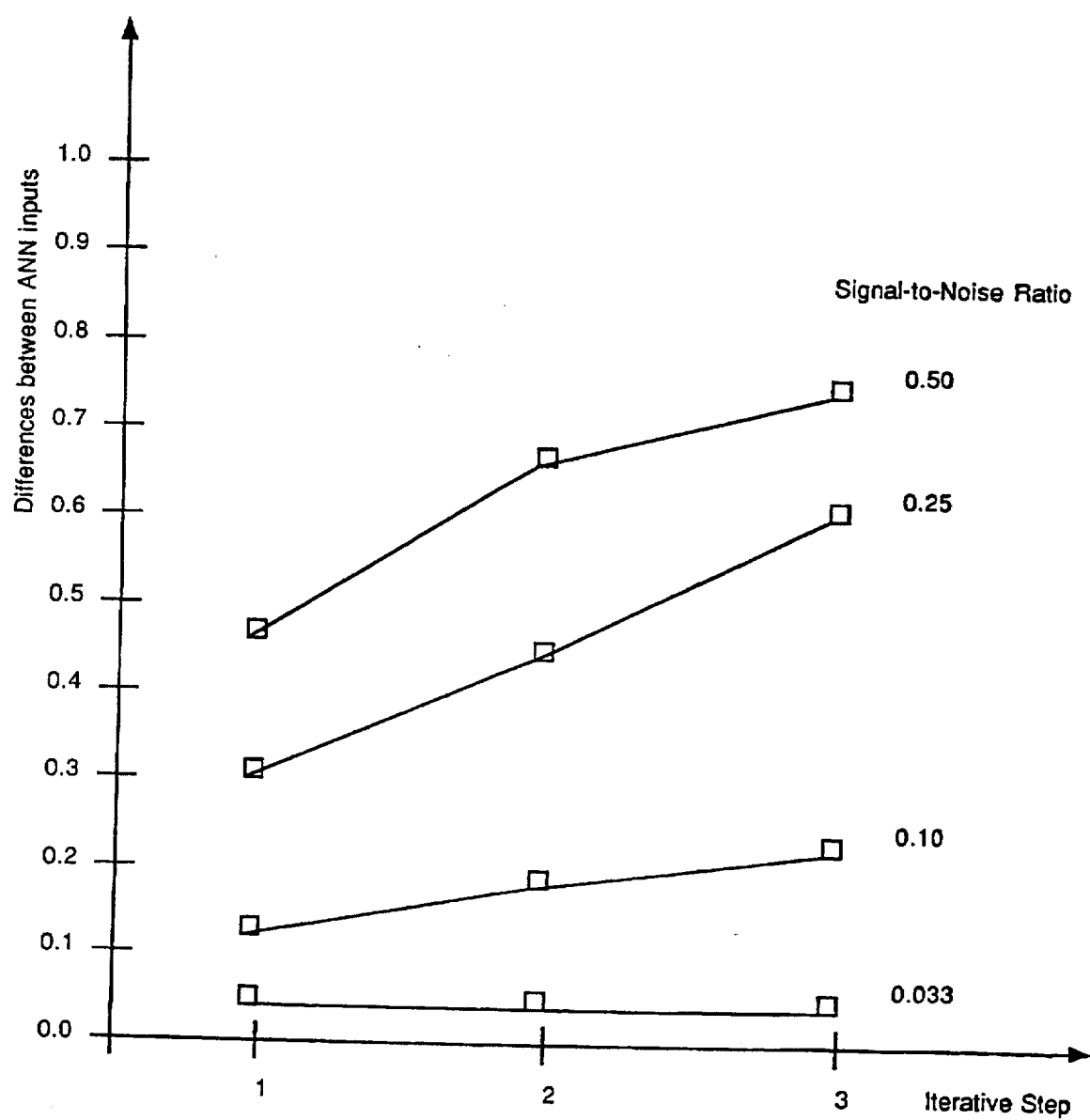
FIG. 16 is a plot of the average differences for the network input values as a function of the cortical signal-to-noise ratio and the recursive iteration step.

Further insight may be gained from the average difference between the network inputs for the correct and incorrect responses at matched iterations. The average differences in these inputs are shown in FIG. 16 as a function of the signal-to-noise ratio and the iteration of the recursive method, for all subjects and letter set sizes combined. The difference plots in this figure reflect the behavior of the average inputs plotted in FIG. 14. The average difference between the inputs for the correct and incorrect responses computed at matched iteration steps, shows a constant increase with iteration step at the higher signal-to-noise ratios. The difference is bounded at the highest signal-to-noise ratio by the allowable extremes in coefficient values of unity and zero. However, this difference decreases in value at the lower signal-to-noise ratios, as does the increase with iteration step. For example, the average difference at the 0.033 signal-to-noise ratio is extremely low and shows no increase with iteration.

Figure 17:
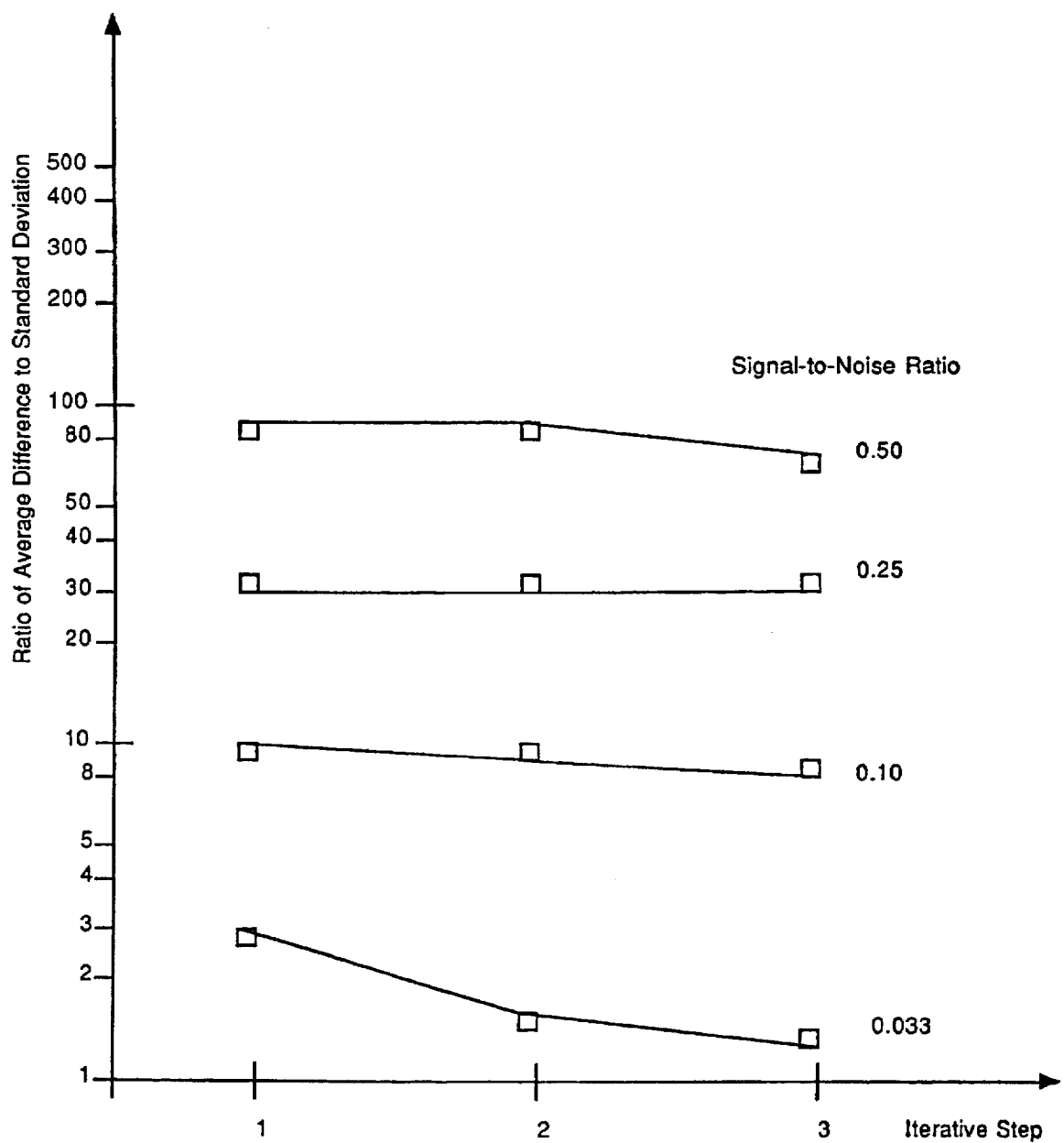
FIG. 17 is a plot of the ratios of the average difference to the standard deviation for the network input values as a function of the cortical signal-to-noise ratio and the recursive iteration step.

The relation between the input differences for the correct and incorrect responses, and the standard deviation of the coefficient values, is shown in FIG. 17. The figure shows the ratio of the average differences divided by the standard deviation as a function of the recursive iteration and the signal-to-noise ratio. Essentially, this ratio approaches the Z-score of a normal distribution for large numbers of samples and is a measure of the statistical significance of the separation between the two responses. For example, a statistical distribution with a ratio greater than 1.96 will enable classification with greater than 95 percent accuracy. As can be seen from the figure, this is true for all but the lowest signal-to-noise ratio of 0.033 where the ratios for the second and third iterations are equal to 1.57 and 1.42 respectively.

Figure 18:
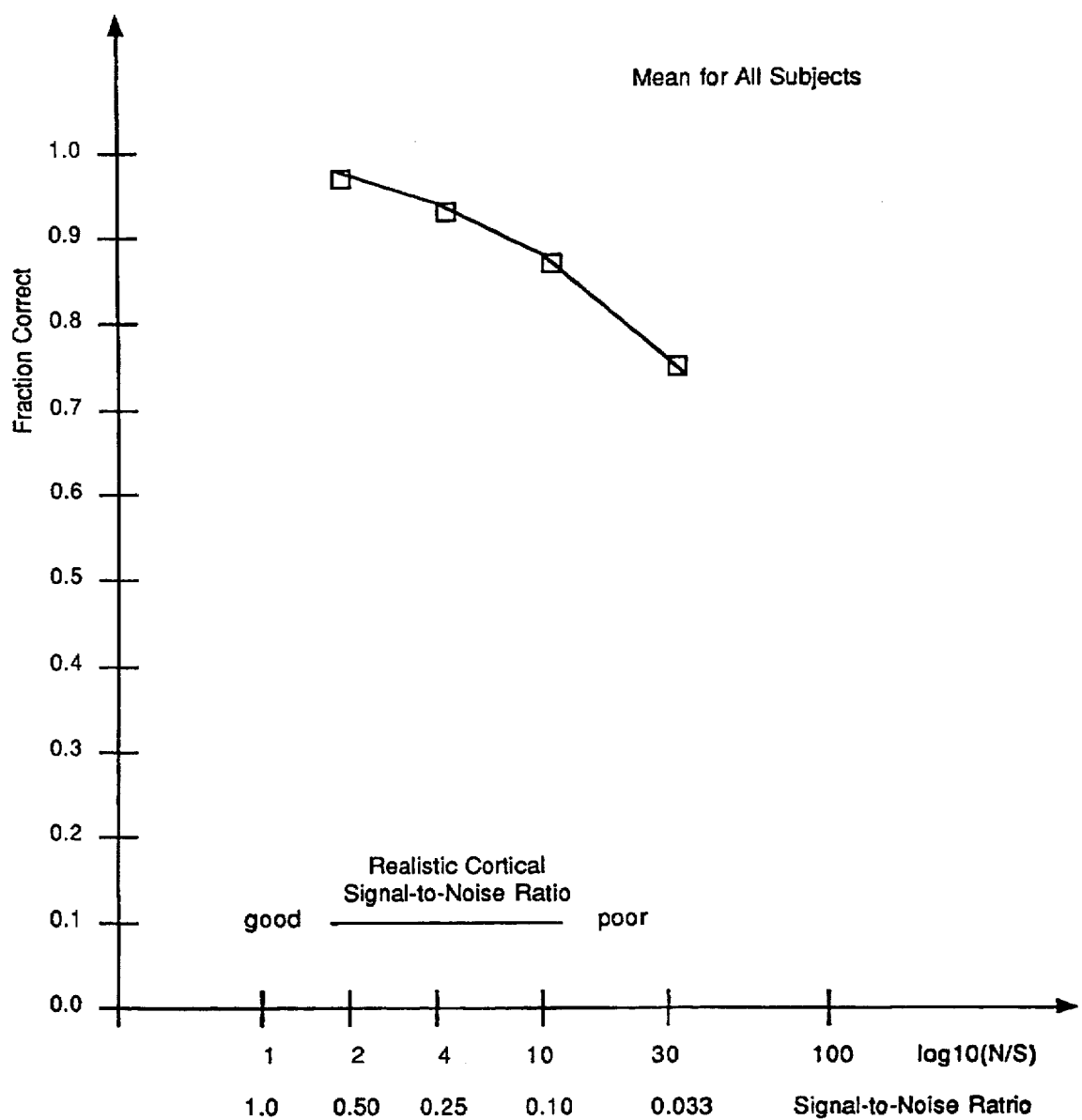
FIG. 18 is a plot of the performance for the artificial neural network (ANN) used in the demonstration as a function of the cortical signal-to-noise ratio.

The results of the computer simulation show that the accuracy of the artificial neural network, using the moving average filter attenuating values as input, varies in a fairly consistent manner across all subjects and letter set sizes, from 97.3 percent for a 0.50 cortical signal-to-noise ratio to 86.2 percent for a 0.10 ratio, which is a realistic range. The fraction of responses correctly predicted is plotted as a measure of the network's performance in FIG. 18 as a function of the signal-to-noise ratio.

In summary, the results of the simulation study of an experiment on the relation between event average response potentials and letter recognition, show that the present invention classifies decisions from single event electroencephalograms with a high level of accuracy.

It will be readily seen by one of ordinary skill in the art that the present invention fulfills all of the objects set forth above. After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof.

Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

What is claimed is:

1. A method for estimating a cognitive decision made by a human in response to a known external stimulus, from the corresponding single-event, evoked cerebral potential, comprising the steps of:

a) mapping the elements of a set of parameters uniquely one-to-one onto the elements of a set of internal cerebral potential sources for all possible decisions which can be made in response to the known external stimulus, where the value of the parameter mapping to the internal source corresponding to the true decision is unity and the values of the remaining parameters are zero;

b) mapping said set of parameters uniquely one-to-one onto a set of attenuators of which the sum of the outputs from said attenuators is the deterministic input to an autoregressive filter used to model the single-event, evoked cerebral potential as a cerebral potential process, and the inputs to said attenuators are the internal cerebral potential sources, where the values of the said parameters are given by the attenuations for the corresponding sources;

c) estimating the values of said parameters by an iterative process performed in turn for each of said possible internal sources as an initial estimate to the true source, by computing in sequence first the corresponding attenuation along with the coefficients of the autoregressive process from the recorded evoked cerebral potential and the waveform of the assumed source, and then computing an update to the source-waveform from the corresponding attenuation, with the product of said iterative process being a recursive sequence of estimations of the parameters for the internal cerebral sources;

d) computing a reliability of the estimation from the human cognitive state by:

(1) computing the power spectrum of the electroencephalogram from the autoregressive coefficients, (2) classifying the cognitive state of the human operator from the power spectrum components with embedded rules for state membership, and (3) computing the reliability of the estimated decision from the classified cognitive state with embedded fuzzy logic rules based on expert knowledge of the cognitive processes as a function of the state; and e) applying said sequence of estimations of the parameters and the estimation reliability as inputs to an artificial neural network used as a classifier, the outputs of which are a measure of the probabilities of the occurrences of all possible decisions which can be made in response to the known external stimulus, and selecting the strongest output of the classifier as the best estimate of the decision made.

2. A method for the unintrusive adaptive aiding of human cognitive functions from the cerebral potential in the monitoring and operation of computerized machinery, by continually estimating a cognitive decision made in response to a set of known task-related stimuli, comprising the steps of:

a) establishing a record file set of all possible internal cerebral sources for the set of known stimuli for the cognitive tasks, by:

(1) recording a sequence of single-event, cerebral potentials which are event-locked to the repeated presentations of the stimuli for multiple occurrences of all possible decisions as responses, (2) computing an event-average response potential for each possible decision from the single-event, cerebral potentials recorded for the occurrences of the decision, (3) computing the autoregressive coefficients for the electroencephalograms of the headers to the single event recordings, (4) computing a waveform for an internal cerebral source for each possible decision for each stimulus from the corresponding event-average potential and the autoregressive filter coefficients with inverse filtering where the attenuation is set to unity, and (5) collecting the internal cerebral sources into a set where each element maps uniquely to the elements of the set of all possible decisions for the set of stimuli;

b) supervised training of an artificial neural network used to represent the decision making process, by:

(1) computing a vector set of recursive estimates of the attenuations in turn for all possible cerebral sources using the method of claim 1 for each single-event, evoked cerebral potential used in the computation of the record file of internal cerebral sources, (2) computing the corresponding estimation reliability from the cognitive state derived from the autoregressive coefficients using the method of claim 1, (3) forming matched pairs between said attenuation vector sets augmented with the estimation reliability and the corresponding decision responses made for each of the single-event evoked responses, and (4) using the data matrix so formed as a training epoch of attenuation inputs matched to the corresponding decision response outputs for the training of the interconnection weights of the network back propagating the output errors;

c) continually recording the human electroencephalogram for the cerebral potential and windowing the resulting recording for a suitable sample period commonly one second;

d) presenting a task-relevant stimulus to the human operator from the set of known stimuli for the cognitive tasks;

e) using the method of claim 1 to estimate the decision made from the cerebral potential, and recognizing the estimation as valid if the discriminant for the classifier exceeds a threshold value; and for a valid estimation f) parsing the expected decision from the task scripts for said task-related stimulus, and determining the cognitive aid to be provided to the human from the discrepancy between the expected decision and the estimation of the decision made.

* * * * *